US011336705B2

(12) United States Patent
Vu et al.

(10) Patent No.: US 11,336,705 B2
(45) Date of Patent: May 17, 2022

(54) DISPLAYING CONTENT FROM MULTIPLE DEVICES

(71) Applicant: ScreenBeam Inc., Santa Clara, CA (US)

(72) Inventors: Chuong Vu, Cupertino, CA (US); Chuang Li, Saratoga, CA (US); Dean Chang, Santa Clara, CA (US); Gin-Pao Lu, Cuertino, CA (US)

(73) Assignee: ScreenBeam Inc., San Jose, CA (US)

( * ) Notice: Subject to any disclaimer, the term of this patent is extended or adjusted under 35 U.S.C. 154(b) by 78 days.

(21) Appl. No.: 16/786,667

(22) Filed: Feb. 10, 2020

(65) Prior Publication Data

US 2020/0177650 A1    Jun. 4, 2020

Related U.S. Application Data

(62) Division of application No. 14/986,468, filed on Dec. 31, 2015, now Pat. No. 10,560,499.

(51) Int. Cl.
*H04L 29/06* (2006.01)
*H04L 65/403* (2022.01)
(Continued)

(52) U.S. Cl.
CPC .......... *H04L 65/403* (2013.01); *H04W 4/08* (2013.01); *H04W 4/70* (2018.02); *H04W 76/14* (2018.02); *H04W 4/80* (2018.02); *H04W 84/12* (2013.01)

(58) Field of Classification Search
CPC ....... H04W 76/14; H04W 4/08; H04W 84/12; H04W 4/80; H04L 65/403
See application file for complete search history.

(56) References Cited

U.S. PATENT DOCUMENTS

| 6,343,313 B1 | 1/2002 | Salesky et al. |
| 2005/0036509 A1 | 2/2005 | Acharya et al. |

(Continued)

FOREIGN PATENT DOCUMENTS

| EP | 1 526 445 A2 | 4/2005 |
| WO | WO-2012/088419 A1 | 6/2012 |
| WO | WO-2014/185690 | 11/2014 |

*Primary Examiner* — Sargon N Nano
*Assistant Examiner* — Kidest Mendaye
(74) *Attorney, Agent, or Firm* — Eversheds Sutherland (US) LLP; Robert D. Ward; Nicola A. Pisano

(57) ABSTRACT

Systems and methods of content sharing on a display are provided by establishing connections between a receiver, moderator client device and a plurality of member client devices via a local network that includes at most one node in the communication pathway between any two endpoints in the network, such as a display and one of the plurality of member client devices. The moderator client device transmits a request to promote a first one of the plurality of member client devices to the receiver, which then receives and transmits to the display content from the first one of the plurality of member client devices. The moderator client device also may monitor the screen displays of the plurality of member client devices; enable the receiver to simultaneously show on the display content from two or more of the plurality of member client devices; request transfer of data from the plurality of member client devices to the moderator client device; or delegate moderator authority or control to a subset of the member client devices.

16 Claims, 17 Drawing Sheets

(51) Int. Cl.
*H04W 4/08* (2009.01)
*H04W 76/14* (2018.01)
*H04W 4/70* (2018.01)
*H04W 4/80* (2018.01)
*H04W 84/12* (2009.01)

(56) References Cited

U.S. PATENT DOCUMENTS

| | | | |
|---|---|---|---|
| 2005/0273510 A1 | 12/2005 | Schuh | |
| 2006/0031779 A1* | 2/2006 | Theurer | G06F 3/1454 715/781 |
| 2007/0261102 A1 | 11/2007 | Spataro et al. | |
| 2010/0333127 A1 | 12/2010 | Scott et al. | |
| 2011/0154192 A1* | 6/2011 | Yang | G06F 40/197 715/256 |
| 2011/0246552 A1* | 10/2011 | Nicholson | H04L 67/14 709/202 |
| 2011/0271129 A1* | 11/2011 | Flannagan | H04L 65/403 713/323 |
| 2012/0272147 A1* | 10/2012 | Strober | G06F 3/01 715/716 |
| 2014/0103104 A1 | 4/2014 | Jover | |
| 2014/0108506 A1* | 4/2014 | Borzycki | H04L 67/1095 709/203 |
| 2014/0141725 A1* | 5/2014 | Jesme | H04W 4/80 455/66.1 |
| 2014/0173701 A1* | 6/2014 | Albouyeh | H04L 63/08 726/4 |
| 2014/0330732 A1* | 11/2014 | Grignon | G06Q 50/01 705/319 |
| 2014/0337769 A1 | 11/2014 | Kim et al. | |
| 2014/0351449 A1* | 11/2014 | Kramarenko | H04L 63/083 709/229 |
| 2015/0149929 A1* | 5/2015 | Shepherd | H04L 65/403 715/753 |
| 2015/0188838 A1 | 7/2015 | Bhattacharya et al. | |
| 2016/0295167 A1 | 10/2016 | Sakurai | |
| 2017/0052755 A1* | 2/2017 | Miki | H04L 12/1831 |
| 2017/0351757 A1* | 12/2017 | Strober | G06F 16/74 |

* cited by examiner

DISPLAYING CONTENT FROM MULTIPLE DEVICES

CROSS-REFERENCE TO RELATED APPLICATIONS

This application is a divisional application of U.S. patent application Ser. No. 14/986,468, filed Dec. 31, 2015, now U.S. Pat. No. 10,560,499, the entire contents of which are incorporated herein by reference in its entirety.

TECHNICAL FIELD

The present disclosure relates, in general, to a graphical display system, and more particularly, to facilitating control of a graphical display by selecting inputs from one or more of multiple sources.

BACKGROUND

Methods and products for connecting a device to an external display are well known in the art. For example, a laptop computer may be connected to a television display using a wired connection such as a High-Definition Multimedia Interface (HDMI) cable. Using the HDMI cable, a single laptop device may connect to a television and mirror content on the laptop display to the television screen. One limitation to using an HDMI cable is that the laptop device must be physically connected to an input of the television, and the distance between the laptop and television may be no greater than the length of the HDMI cable. In addition, only a single device may be connected to the television using an HDMI cable.

Methods and products for wirelessly connecting a device to an external output device are also well known in the art. For example, a laptop device may connect to a speaker wirelessly using Bluetooth technology. Bluetooth is a wireless technology standard for exchanging data. While Bluetooth allows for multiple devices to be connected at the same time, Bluetooth technology is typically limited to low-bandwidth situations, making it unsuitable for video streaming and screen sharing applications.

Another wireless technology standard for projecting a device display to a remote display, e.g., television, is Wi-Fi Direct, a Wi-Fi Alliance standard that allows Wi-Fi capable devices to connect directly to one another without requiring internet connectivity. Using Wi-Fi Direct technology, a group of several devices may connect simultaneously. While not all devices need to be Wi-Fi Direct Certified, all must have Wi-Fi capability, and at least one must have Wi-Fi Direct capability. Although Wi-Fi Direct enables wireless connections to be established between devices, it does not provide a protocol for sharing content.

The Miracast® wireless display standard, certified by the Wi-Fi Alliance, defines a protocol for displaying multimedia between devices using Wi-Fi CERTIFIED Wi-Fi Direct®. Implementing Wi-Fi Direct, Miracast® provides operations for negotiating video capabilities, setting up content protection, streaming content, and maintaining a video session. Unlike Bluetooth technology, Wi-Fi CERTIFIED Miracast® allows for sending up to 1080p HD, or even higher resolution video and thus is suitable for video streaming and screen to screen content sharing. For example, Miracast® makes it possible to wirelessly stream video content from a laptop computer to a television display. While Miracast® using Wi-Fi Direct technology allows for wireless content sharing between two devices, it does not allow for multiple video sources to connect at the same time. In other words, it does not have a mechanism for negotiating content sharing when input is received from multiple devices simultaneously.

In view of the foregoing limitations of previously known systems and methods, it would be desirable to provide systems and methods that enable a computer user to share with several other computer users a view of his or her computer screen.

It further may be desirable to provide systems and methods, for example, in a classroom or conference setting, for a teacher or moderator to select any one of multiple student/conferee computer users to share with a teacher, moderator or the classroom/audience, a view of the respective student's or conferee's computer screen.

It further may be desirable to enable a teacher or moderator to simultaneously monitor the computer displays of students or conferees.

It still further would be desirable to provide a method of managing the display of the various users and to facilitate sharing between the multiple computer screens.

SUMMARY OF THE INVENTION

In accordance with one aspect of the present invention, an illustrative content sharing system and method may include establishing, by a receiver device, a connection with a moderator client, a first member client, and a second member client via a local network in which the receiver serves as a hub. The local network may include at most one node in the communication pathway between any two endpoints in the network, such as the first member client and the moderator client, or the first member client and the second member client.

The system and method may include a mechanism for selecting and managing content received from any one or more of multiple users involving, receiving, from the moderator client, a request to select or "promote" a first member client to become a presenter and receiving, from the first member client device, first content. Further, in response to the request to promote the first member client, the first content may be transmitted to a display.

The system and method further may include receiving, from the moderator client, a request to promote a second member client and receiving, from the second member client, second content. In response to promotion of the second member client, the first member client may be demoted so that it is no longer the presenter and the second member client becomes the presenter. The system and method may further include transmitting to the display the second content received from the second member client.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present invention will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

There are many instances in which a computer user may wish to share the display of his or her computer screen with others. For example, in connection with a presentation being given at a business meeting, a speaker may desire to display information to an audience, a teacher may wish to show a classroom of students a computer display, etc. In other instances, multiple users may wish to each share a screen display with others. For example, project team members may work collaboratively on a project, and it may be desirable to show other team members a screen display. As yet another example, a teacher may give students a task to be performed on computers, and the teacher may wish to view one or more of the students' screens at any given time. In another situation, the teacher may wish to show examples of a student's work to the other students on a main display. In such instances, it may be advantageous to quickly and easily display one (or more) of several computer displays on a large screen visible to many people.

Figure 1:
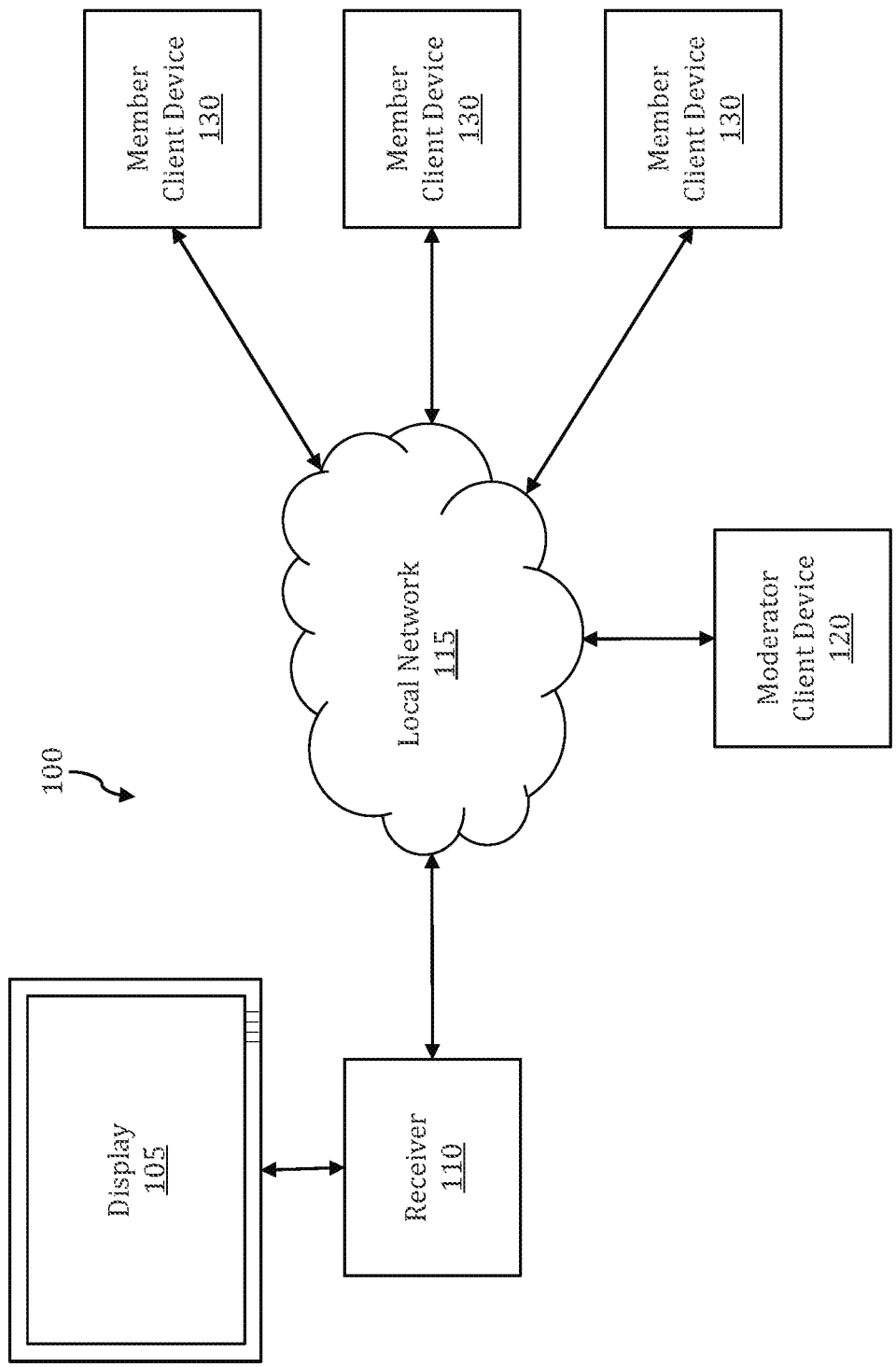
FIG. 1 is a block diagram of a content sharing system in accordance with an illustrative embodiment of the present invention.

FIG. 1 is a block diagram of an illustrative content sharing system constructed in accordance with the principles of the present invention. Content sharing system 100 includes display 105, receiver 110, local network 115 in which receiver 110 serves as the hub, moderator client device 120 to be used by the moderator client, and member client devices 130 to be used by the member clients. Although in FIG. 1, three member client devices 130 are depicted, it, of course, will be understood that any different number of devices may be used.

A client device may be identified as the moderator client device 120 by making that selection when signing into or syncing with the content sharing system. Alternatively, the client device that begins or creates the content sharing session may be identified as the moderator client device 120. In yet another example, the receiver may incorporate a calendaring system facilitating the scheduling of meetings between clients. When a member client schedules a meeting appointment using the content sharing system, the device of the client that made the meeting appointment may be elected as the moderator client device 120 by default. All clients that are not the moderator client will be deemed member clients.

In the embodiment of FIG. 1, moderator client device 120 and member client devices 130 interact through local network 115 to send content to receiver 110. Receiver 110 receives communications from moderator client device 120, and responsive to those communications, causes the content of one or more of member client devices 130 to be displayed on display 105. Display 105 may be any suitable display and provides an interface for presenting information received from receiver 110 to external systems, users, or memory. Display 105 may be a television screen, a computer monitor, or a projector and also may include an interface to a printer or a speaker, etc. In an alternative embodiment, display 105 may comprise multiple individual displays, and even may constitute the displays associated with each of member client devices 130 and/or moderator client device 120.

Receiver 110 may be coupled to display 105, either by wire or wirelessly, and transmits content received from moderator client device 120 and one or more member client devices 130 to display 105, which illustratively is shown on display 105. In a preferred embodiment, receiver 110 and display 105 connect using a high-definition multimedia interface (HDMI) cable. Alternatively, receiver 110 and display 105 may use Bluetooth® wireless communications, Wi-Fi or Wi-Fi Direct technology, wireless Ethernet, wired Ethernet, a coaxial cable, or other wired connection. Receiver 110 is configured to transmit audio, video, or still images to display 105. In one illustrative embodiment, receiver 110 is a ScreenBeam® Wireless Display Kit, available from Actiontec Electronics, Inc. Receiver may also be a computer such as a desktop computer.

Receiver 110 may be incorporated into moderator client device 120. For example, receiver 110 may be incorporated into a laptop serving as moderator client device 120. This configuration may be appropriate where there are not many member client devices. In yet another example, receiver 110 may be incorporated into a single member client device 130, such as a laptop serving as a member client device 130. This configuration may be appropriate where there is only one member client in the content sharing system.

In accordance with the principles of the present invention, any suitable arrangement of receiver 110 and display 105 may be employed. For example, receiver 110 and display 105 may be separate components or be combined into a single device.

Receiver 110 receives content to be displayed on display 105 from one or more of moderator client device 120 and one or more of member client devices 130. For example, moderator client device 120 may be a laptop computer with a local display screen. In this case, moderator client device 120 may transmit to receiver 110 information displayed on the local display screen. Receiver 110, in turn, transmits the information from moderator client device 120 to display 105. In this case, the local display of moderator client device 120 and display 105 may display the same information (e.g., the same graphics, video, image, chart, presentation, document, program, application, window, view, etc.).

Receiver 110, moderator client device 120, and member client devices 130 also communicate with one another through local network 115, which may be any suitable communications network. In FIG. 1, local network 115 illustratively may include a local area network (LAN) such as a local Wi-Fi Direct network, but also may include an Ethernet-based LAN, a metropolitan area network (MAN), a wide area network (WAN), a cellular network, the Internet or a wired and/or wireless network. Local network 115 may be a local peer-to-peer network, for example, a Wi-Fi peer-to-peer interface.

In a preferred embodiment, local network 115 is a local network. For example, local network 115 may be a Wi-Fi Direct (e.g., Wi-Fi P2P) network in which receiver 110, moderator client device 120, and member client devices 130 communicate with each other directly, without the use of an infrastructure access point. In this embodiment, receiver 110 serves as the hub for the local peer-to-peer network. In alternative embodiments, receiver 110, moderator client device 120, and member client devices 130 may communicate with each other using any suitable direct connection, such as Bluetooth® or ZigBee.

Local network 115 is a local network wherein data transfer between receiver 110, moderator client device 120, and/or member client devices 130 may be localized, e.g., using an infrastructure access point as described below in connection with the embodiment of FIG. 2A, thereby reducing traffic over a larger communications network. For example, a school may have multiple classrooms simultaneously using content sharing system 100 of the present invention. Because data traffic on each of content sharing systems 100 is localized, however, the larger communications network of the school (e.g., routers, switches, hubs, bridges, etc.) will be largely unaffected. Moreover, because data traffic is localized, data transfer between receiver 110, moderator client device 120, and member client devices 130 will be faster.

In embodiments in which local network 115 is a local wireless network, the larger communications network in which local network 115 operates may be optimized to use the available wireless spectrum.

In one preferred embodiment, receiver 110 is Miracast® aware and compatible.

Figure 2A:
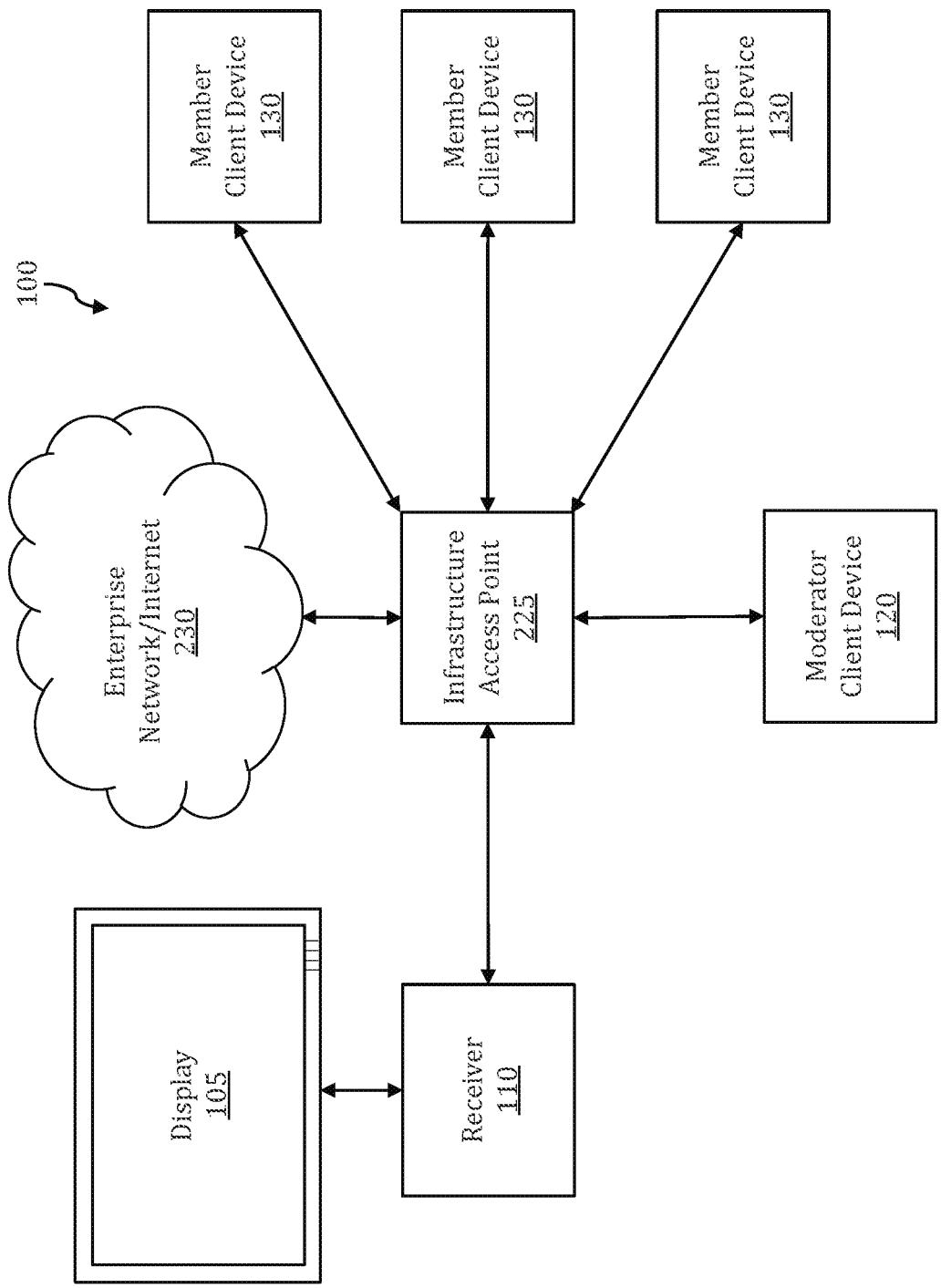
FIGS. 2A and 2B are block diagrams of content sharing systems in accordance with the principles of the present invention in which an access point interconnects the system components.

Referring now to FIG. 2A, infrastructure access point 225 is employed to establish communications between receiver 110, moderator client device 120, and member client devices 130, and to the enterprise network and the Internet. In a preferred embodiment, all of receiver 110, moderator client device 120, and member client devices 130 communicate wirelessly with infrastructure access point 225. Infrastructure access point 225 may also communicate with Enterprise Network/Internet 230 to establish communication with the Internet.

In alternative embodiments, one or more of receiver 110, moderator client device 120, or member client devices 130 may communicate with infrastructure access point 225 through one or more networks, including the Internet. For example, receiver 110, moderator client device 120, and member client devices 130 may be co-located in a single conference room, while infrastructure access point 225 may be remote from the conference room. In another example, member client devices 130, moderator client device 120, and various displays may be in neighboring offices, while receiver 110 and infrastructure access point 225 may be in yet another room down the hall. The moderator client device 120, member client devices 130, and various displays may each be in wireless communication with infrastructure access point 225 and receiver 110.

Figure 2B:
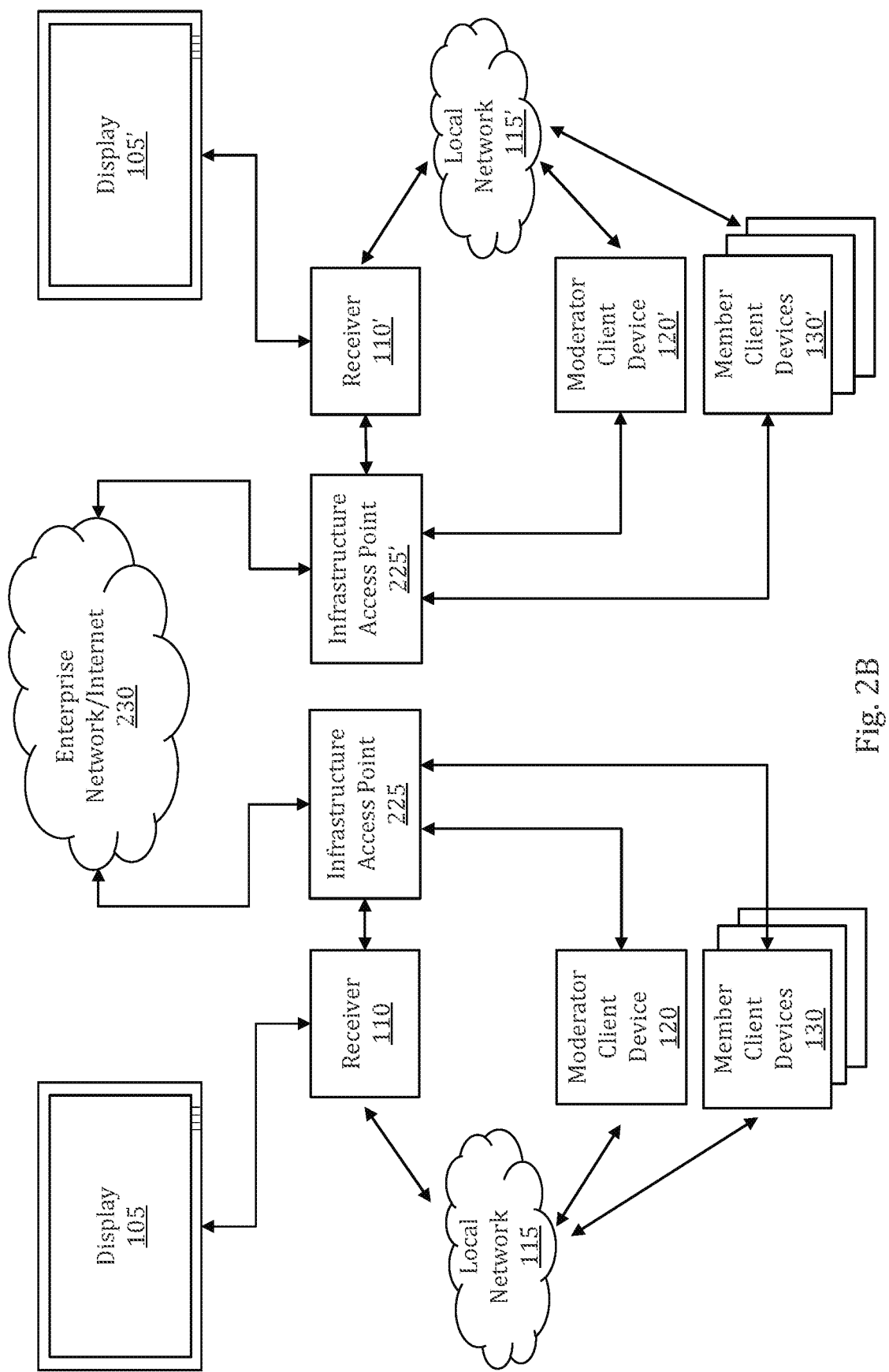

In the embodiment illustrated by FIG. 2B, receiver 110, display 105, infrastructure access point 225, moderator client device 120, and member client devices 130 may be located in a conference room in the United States and additional second receiver 110', second display 105', second infrastructure access point 225', second moderator client device 120' and second member client devices 130' may be in another conference room in China. Local network in the United States 115 comprising a receiver 110, moderator client device 120, and member client devices 130 may communicate with infrastructure access point 225, while local network in China 115' comprising second receiver 110', second moderator client device 120', and second member client devices 130' similarly may communicate with second infrastructure access point 225'. Infrastructure access point 225 in the United States and second infrastructure access point 225' in China may connect via the internet or any suitable network.

In the embodiment illustrated by FIG. 2B, moderator client device 120 and second moderator client device 120' may control the communication between the conference room in the United States and the conference room in China. As the moderator of the United States content sharing network, moderator client device 120 may control the content displayed on display 105. Similarly, as the moderator of the Chinese content sharing network, moderator client device 120' may control the content displayed on display 105'. Moderator client device 120 may delegate moderator authority to moderator client device 120' such that moderator client 120' may select the content to be displayed on display 105. Similarly, moderator client device 120' may delegate moderator authority to moderator client 120 such that moderator client 120 may select the content to be displayed on display 105'. In this way, moderator client device 120 and moderator client device 120' may serve as each other's tiered moderators while simultaneously serving as a moderator in their local content sharing networks.

In one example, moderator client device 120 initially may be deemed the presenting client. The content from moderator client device 120 may be displayed on display 105. Display 105' may duplicate the image of display 105 such that content from moderator client device 120 is displayed on both display 105 and display 105'. Moderator client device 120 may delegate authority to moderator client device 120' allowing moderator client device 120' to become the presenting client. Content from moderator client device 120' may then be displayed on display 105'. Display 105 may then duplicate the content shown on display 105'.

The conference room in the United States and the conference room in China may each have more than one display. For example, the conference room in the United States may have a first and second display, and the conference room in China may have a first and second display. The content from moderator client device 120 may be displayed on the first United States display. The content on the first Chinese display simply may duplicate the content on first United States display. Moderator client device 120' similarly may display content on the second Chinese display. Second United States display may then duplicate the content shown on second Chinese display. Arranged in this configuration, moderator client device 120 and moderator client device 120' may again serve as one another's tiered moderators. When moderator client device 120' is deemed the presenting client, moderator client device 120' may control display content on the first United States display. Similarly, when moderator client device 120 is deemed the presenting client, moderator client device 120 may control display content on second Chinese display.

Figure 14:
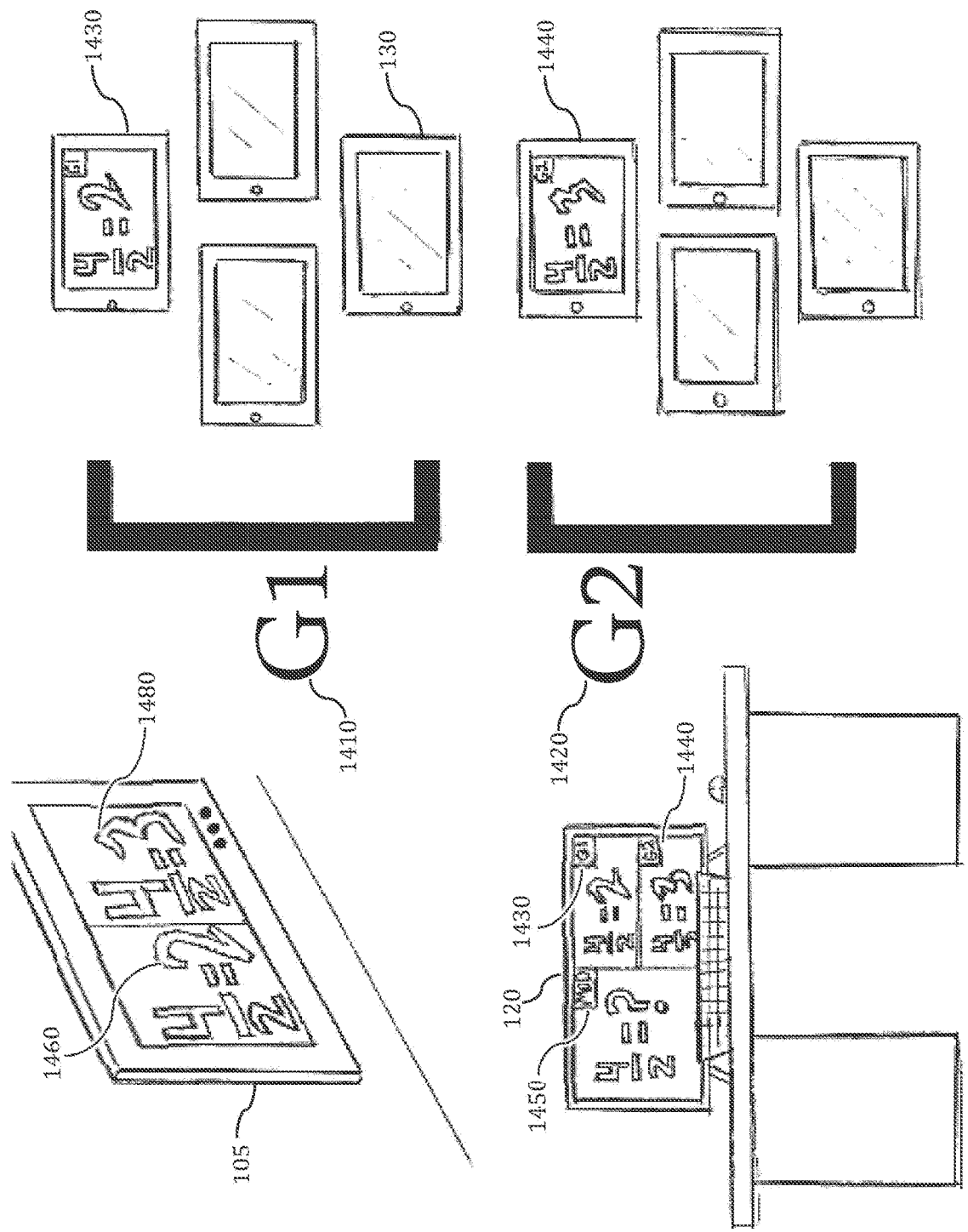
FIG. 14 is a diagram of a moderator device, a display device, and two groups of member client devices for the embodiment depicted in FIG. 13.

Alternatively, the system may operate without second moderator client device 120', and thus the sole moderator, moderator client device 120, may control all communication between moderator client device 120, member client devices 130, and second member client devices 130'. In this example, receiver 110' will imitate receiver 110. In yet another example, the system may operate without second moderator client device 120' but one member client device 130' may be delegated as a group leader and thus may be delegated moderator authority over member client devices 130' providing the group leader discretion over what content to display on display 105' as well as authority to view all member client 130' devices. Delegating authority to a group leader is shown in FIG. 14 and discussed in more detail below.

Display 105' may not be a standalone device but instead may be incorporated into individual client devices. Alternatively, display 105 and display 105' may each be comprised of several displays.

In accordance with the principles of the present invention, second moderator client device 120', second member client device 130', second display 105', second infrastructure access point 225' and second receiver 110' may simply be in a different conference room of the same building as the counterpart network or may be distributed throughout several rooms of a single office building.

Although FIGS. 1 and 2A illustrate a single display 105, any suitable number of displays 105 may be used. For example, moderator client device 120 and some of member client devices 130 may be located in a room with display 105, while additional member client devices 130 may be located in a different room having a different display. Each of the displays may receive content to be shown from receiver 110 using any suitable communications method, such as the Internet.

Moderator client device 120 and member client devices 130 may be any suitable computing devices. Moderator client device 120 and member client devices 130 may be the same types of devices, e.g., laptops or tablets. Alternatively, moderator client device 120 may be a different type of device, e.g., laptop or desktop computer and monitor, while member client devices 130 may include laptops or tablets. As will, of course, be understood, member client devices 130 may be the same or different from one another. For example, member client devices 130 may include laptops, desktops, mobile phones, smartphones, tablets, or other display devices. In addition, one or more of member client devices 130 may not include display devices, but instead include a set top box (e.g., an Apple TV®), a camera, or television cable or satellite receiver. Moderator client device 120 and member client devices 130 may be configured to run any suitable operating system such as Windows® (e.g., Windows 8.1, Windows 10, Windows RT, Windows Phone 8.1, etc.), Apple OS® (e.g., OS X, iOS, etc.), Android® (e.g., Android 4.0, Android 4.1, Android 4.4, Android 5.0. etc.).

In one illustrative embodiment, content sharing system 100 uses server/client model architecture. In this case, receiver 110 functions as the server while moderator client device 120 and member client devices 130 functions as clients. In such an embodiment, receiver 110 selectively establishes and terminates connections with member client devices 130 responsive to commands from moderator client device 120.

Illustratively, receiver 110 may be Miracast® compatible and control the stream of content within content sharing system 100. In particular, receiver 110 manages communications between client devices (e.g., moderator client device 120 and member client devices 130) and also controls the stream of content between the client devices and display 105. Receiver 110 may be configured to run in Autonomous Group Owner (AGO) mode defined in the Wi-Fi Direct standard and/or standard Wi-Fi infrastructure protocol.

In a preferred embodiment, receiver 110 runs a ShareCast protocol configured to control the flow of information between devices. Each of the client devices (e.g., moderator client device 120 and member client devices 130) runs an application that facilitates communication between the respective client and receiver 110 via the ShareCast protocol.

In such an embodiment, Miracast® compatible receiver 110, operating the ShareCast protocol, receives instructions from moderator client device 120 regarding how receiver 110 should control the flow of content. For example, the display on a laptop computer of the moderator client may be transmitted to receiver 110 operating the ShareCast protocol, and forwarded to display 105. In this case, the display of moderator client device 120 and display 105 may display the same content. Alternatively, moderator client device 120 may direct receiver 110 that content from a specified member client device may be displayed on display 105. Thus, receiver 110 receives information from specified member client device 130 and transmits that information to display 105.

Figure 3:
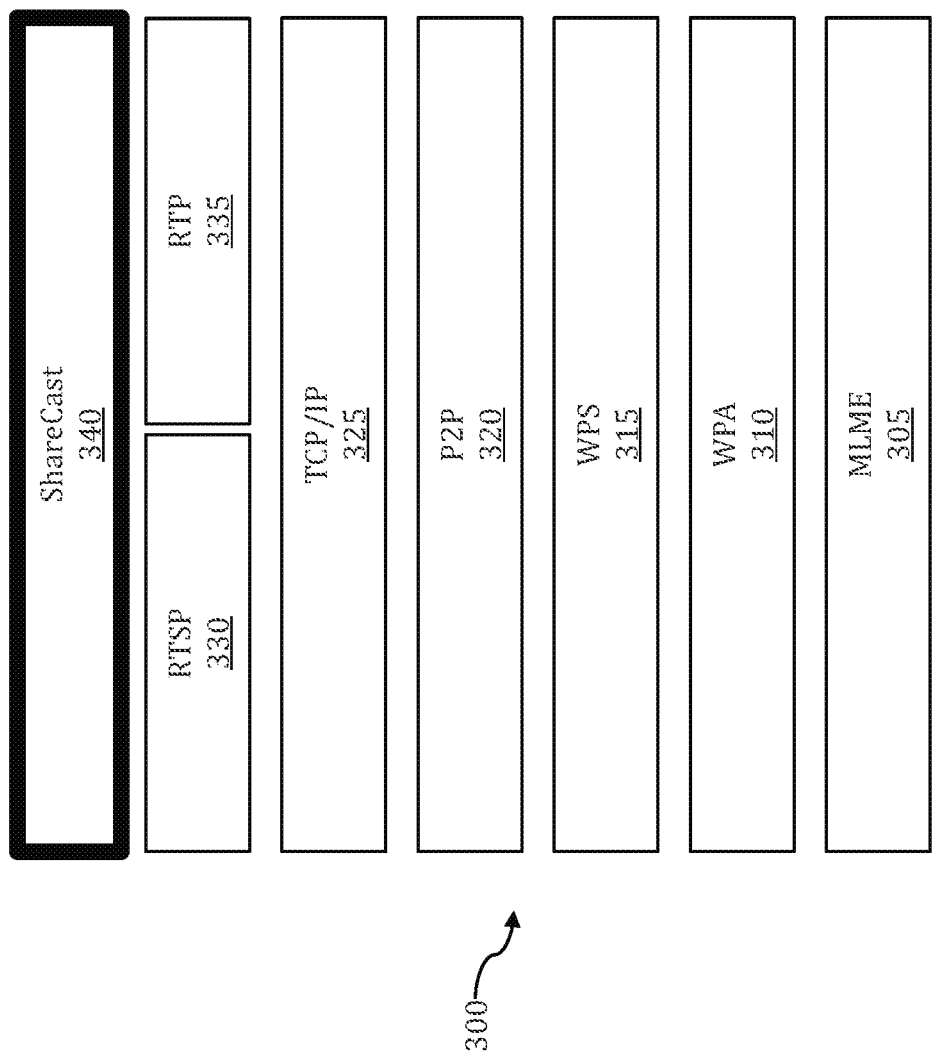
FIG. 3 is a diagram of a communications protocol stack suitable for use with the illustrative embodiments of FIGS. 1 and 2.

Referring to FIG. 3, a diagram of a communications protocol stack in accordance with the principles of the present invention is described, in which the receiver is Miracast @ compatible and runs the ShareCast protocol. The diagram of FIG. 3 is meant to be illustrative only and not limiting with respect to number of protocols, specific protocols, or hierarchy of protocols.

Illustrative protocol stack 300 includes MAC Sublayer Management Entity (MLME) 305, such as the IEEE 802.11 MLME standard. The MLME layer may be followed by a suitable security protocol, such as Wi-Fi Protected Access (WPA) 310. In alternative embodiments, other suitable security protocols, such as WEP, WPA, or WPA2 may be used. The WPA layer may be followed by Wi-Fi. Protected Setup (WPS) 315 layer, and then peer-to-peer (P2P) 320 protocol layer that is used to manage communications, and to partition workloads between the devices. Transmission Control Protocol/Internet Protocol (TCP/IP) 325 may then follow the P2P layer. In alternative embodiments, any suitable Internet protocol suite may be used, e.g., TCP/IP 325 includes only TCP (or a similar transport layer protocol) or only IP (or a similar Internet layer protocol). The TCP/IP layer preferably is immediately followed by Real-Time Streaming Protocol (RTSP) 330 and Real-Time Transport Protocol (RTP) 335 layer, as defined in the Miracast® standard. RTSP 330 is the protocol, based on TCP/IP, for setting up, monitoring, and tearing down a Miracast® session. RTP 335 is the protocol based on UDP/IP for data transfer. Finally, the last layer is ShareCast protocol 340, which uses a proprietary message mechanism over TCP/IP for controlling which client device display, is provided on any given screen.

In a preferred embodiment, the content sharing system utilizes receiver 110 that is Miracast® compatible, and runs the ShareCast protocol. Moderator client device 120 and member client devices 130 connect to receiver 110 using the Miracast® utility of their respective operating systems, such as Windows® 8.1 or Windows® 10. Once connected to the receiver, moderator client device 120 and member client devices 130 establish a content sharing session consistent with the operations depicted in FIG. 4. In this preferred embodiment, the content sharing session is managed by the ShareCast protocol.

Figure 4:
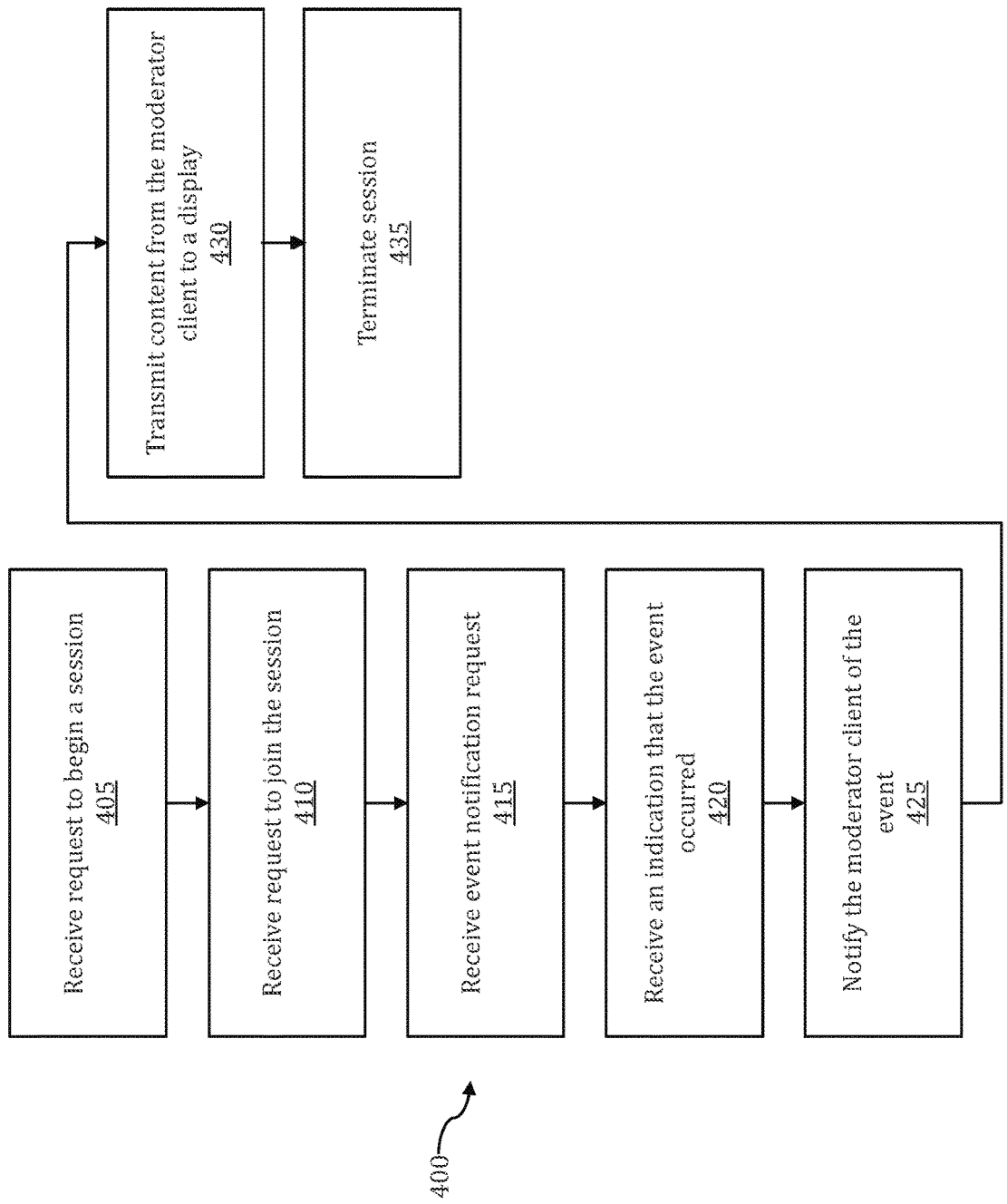
FIG. 4 is a flow chart of an illustrative method of achieving content sharing in accordance with the principles of the present invention.

Referring now to FIG. 4, a flow chart is provided that shows an illustrative sequence for creating and terminating a content sharing session between a moderator client and a member client in accordance with the ShareCast protocol.

First, moderator client device 120 searches local network 115 for receiver 110. After locating the receiver, moderator client device 120 establishes a connection to receiver 110 and transmits a request to begin a session.

At step 405, the request to begin a session is received by receiver 110 from . . . moderator client device 120. In a preferred embodiment, only a client device that is authorized to become a moderator client may serve as moderator client device 120. In alternative embodiments, whichever client device that first requests to initiate a session may be designated as moderator client device 120. For example, a file within the ShareCast application may include a list of MAC addresses that is consulted to determine whether a specific client may serve as moderator client device 120. Alternatively, each client may be required to register its name and role when it first connects to receiver 110.

At step 410, a request from a member client device to join the session is received by receiver 110. In embodiments in which member client devices 130 cannot initiate a session, the request to join the session may be sent to receiver 110 by moderator client device 120. Preferably, receiver 110 does not initiate a session until a moderator client device requests to initiate or join a session. Alternatively, if a member client device requests to initiate a session, receiver 110 may create a limited-access session until moderator client device 120 joins the session. For example, in a limited-access session, the receiver may allow member client devices 130 to join the session, but may not transmit content from member client devices 130 to display 105 until authorized by a moderator client device to do so.

Clients that join the session may use a WebSocket protocol to connect to receiver 110, to provide a full-duplex communication channel over a TCP connection, although any other suitable protocol may be used.

At step 415, an event notification request is received. Moderator client device 120 may request to be notified of any suitable event, such as a new member client joining or leaving the session. At step 420, receiver 110 receives an indication that an event has occurred. At step 425, receiver 110 notifies moderator client device 120 of the occurrence of the event.

At step 430, content from the moderator client is transmitted to a display. For example, receiver 110 may receive content from moderator client device 120 and transmit the content to display 105. The content may be, for example, a mirror of the screen of moderator client device 120.

At step 435, the content sharing session is terminated. A content sharing session may be terminated by the Miracast® server. For example, if moderator client device 120 disconnects from the session, the Miracast® server may tear down the session.

Figure 5:
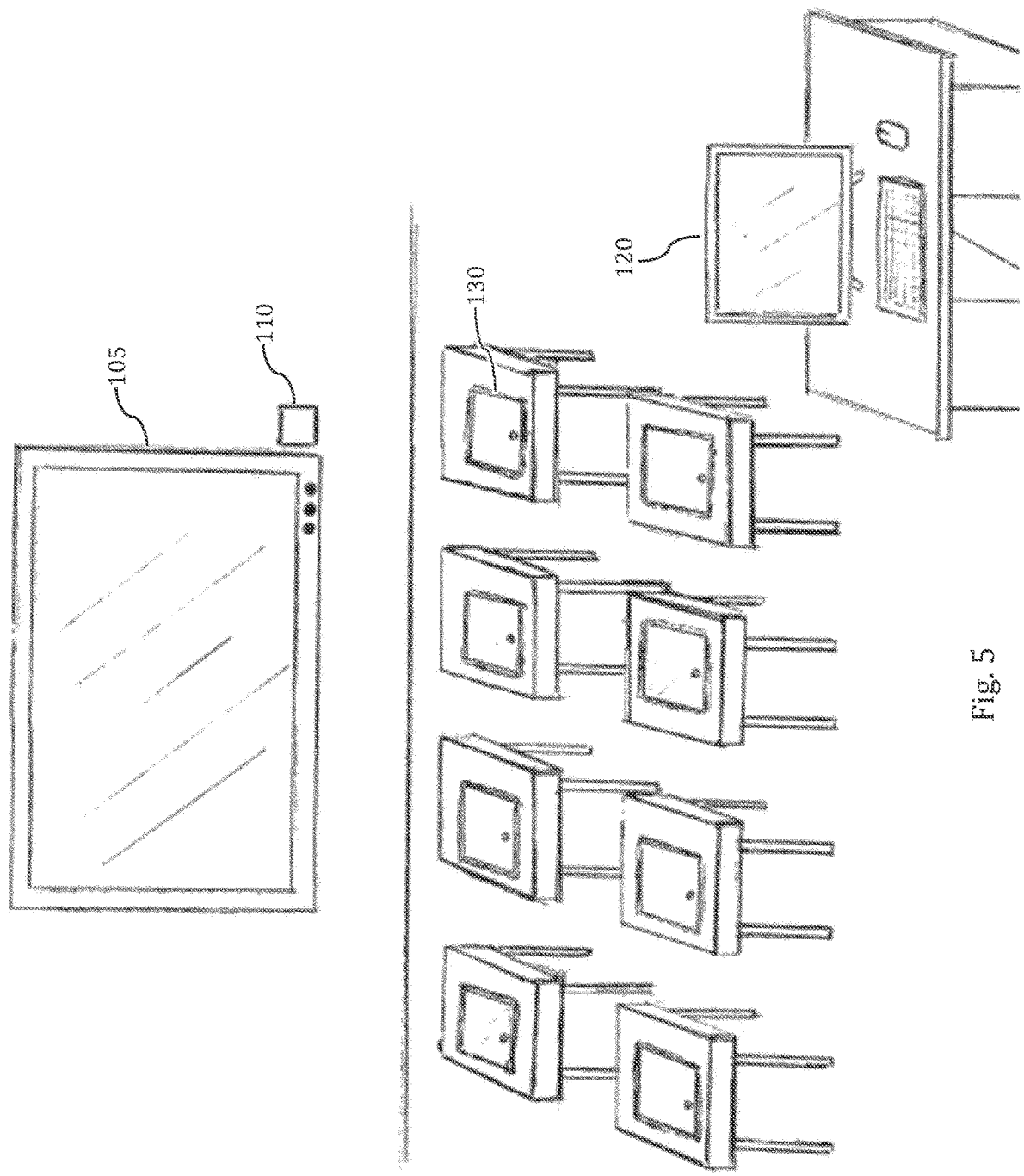
FIG. 5 is a diagram of content sharing in a classroom setting in accordance with one aspect of the present invention.

FIGS. 5-16 depict an embodiment of a system constructed in accordance with the principles of the present invention for use in a classroom setting. Referring to FIG. 5, the teacher's desktop computer is designated as moderator client device 120, while wireless tablets located at each student's desk serve as member client devices 130. Moderator client device 120 and member client devices 130 wirelessly communicate with receiver 110, which preferably runs in Autonomous Group Owner (AGO) mode or includes a wireless access point. Receiver 110 preferably is a ScreenBeam Wireless Display Kit, available from Actiontec Electronics, Inc., Sunnyvale, Calif.

A content sharing protocol is useful in the classroom setting for both educational and managerial purposes. Using the content sharing system described herein, a teacher may integrate video and images into the lesson plan. Students may view the content on their individual devices and, in some embodiments, may also view the content on a display screen. Interaction between the teacher and students may be easily facilitated via the content sharing system. For example, after sharing content with the student, the teacher may pose a question that requires immediate input from a student using the content sharing platform, and select or "promote" the display on a called-upon student's member client device 130 for presentation on display 105. At all times the teacher preferably controls distribution and display of content. The teacher also may monitor in real time the screens of students and any content being shared between the students.

Figure 6:
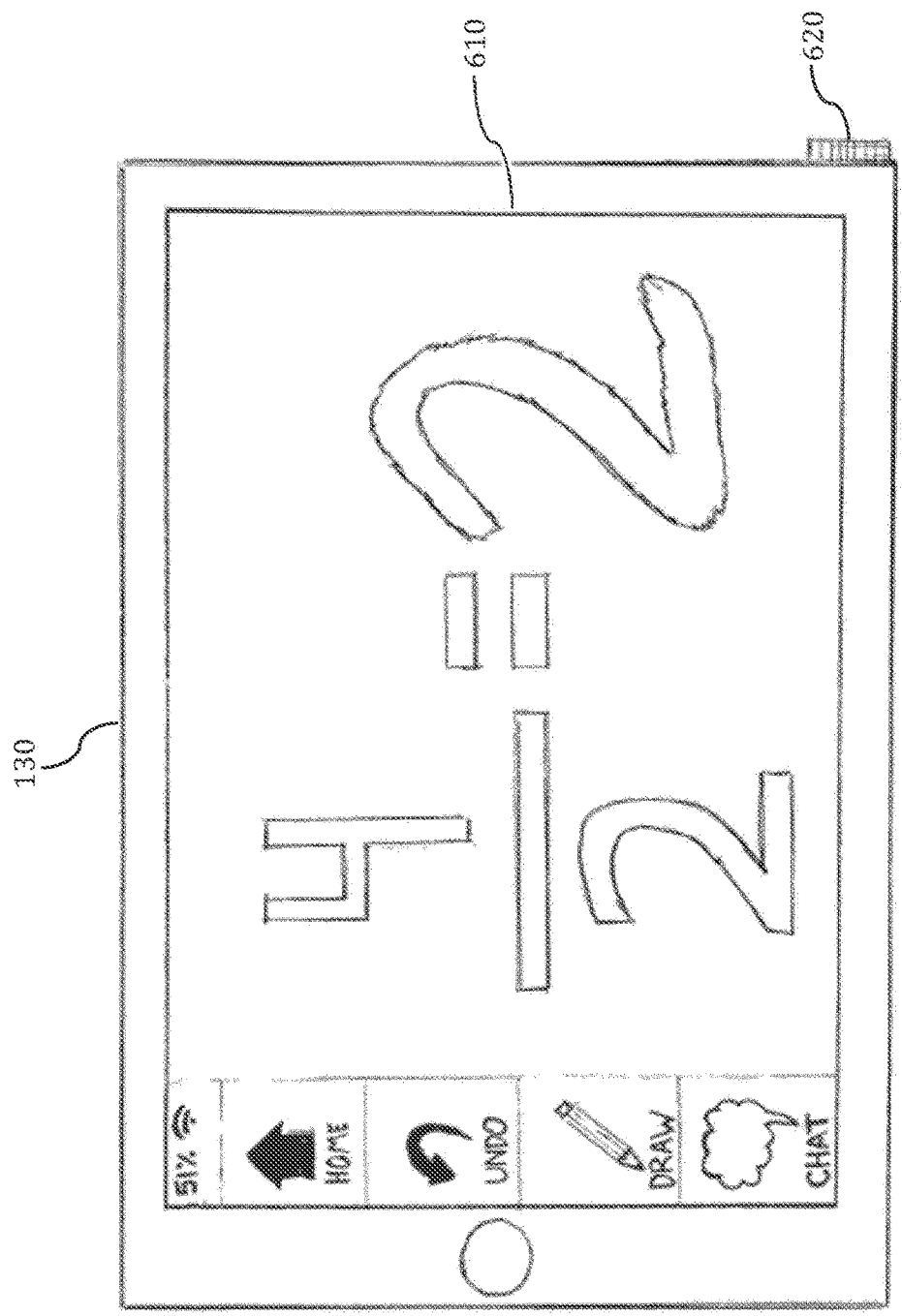
FIG. 6 is an exemplary display of a student client device participating in the content sharing arrangement depicted in FIG. 5.

FIG. 6 depicts exemplary member client device 130 used by students in the classroom setting of FIG. 5. Device 130 preferably is a tablet computer having touchscreen 610 for viewing, making selections, and otherwise providing input, such as an Android tablet, Apple iPad®, or Microsoft Surface Pro® tablet. Students may also provide input by speaking into microphone 620.

Figure 7:
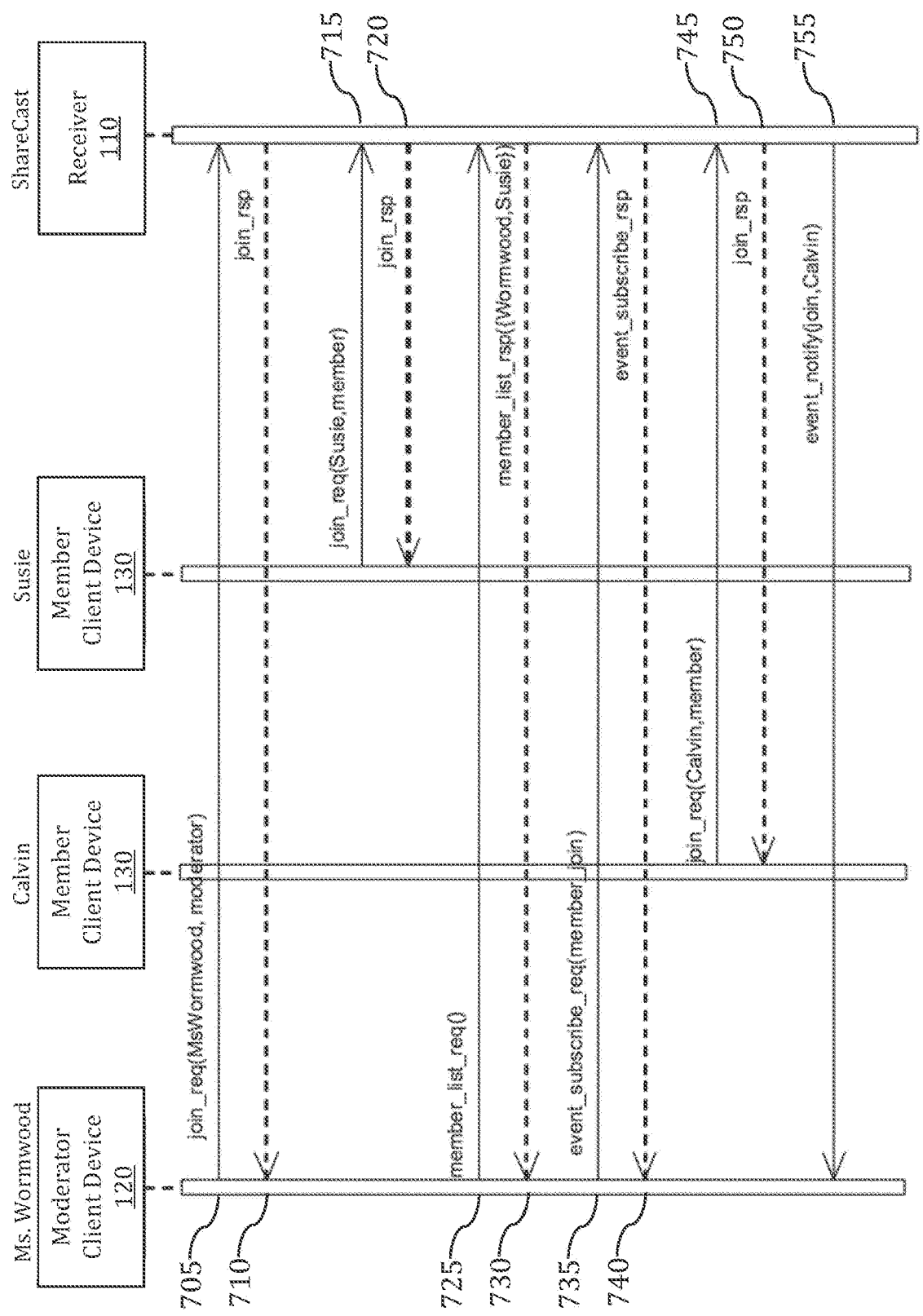
FIG. 7 is a sequence diagram for initiating a session in accordance with the illustrative embodiment depicted in FIG. 5.

In the classroom setting example of FIG. 5, a content sharing session may be initiated in the manner illustrated in FIG. 7. In this example, the teacher "Ms. Wormwood" uses moderator client device 120, while students "Susie" and "Calvin" use member client devices 130. Receiver 110 is Miracast® compatible and runs the "ShareCast" protocol. Moderator client device 120 and member client devices 130 also are Miracast® compatible and have the ShareCast software installed.

To initiate a content sharing session, Ms. Wormwood transmits to receiver 110 in message 705 a request to initiate and join a session. Message 705 also may indicate that request originated from moderator client device 120. In response to receipt of message 705 by received 110, receiver 110 transmits acknowledgment 710 to Ms. Wormwood, indicating that the request has been received.

Next, student "Susie" transmits message 715 to receiver 110 requesting to join the content sharing session. Message 715 may indicate that it was transmitted from a member client device, and that the requestor's session ID is "Susie." In an embodiment in which receiver 110 handles multiple content sharing sessions simultaneously, message 715 also may indicate which session client member device 130 is requesting to join. In response to receipt of message 715, receiver 110 transmits message 720 to Susie, acknowledging that message 715 was received and that Suzie's member client device 130 has been added to the session.

As it may be desirable for the moderator to know which member client devices are participating in a session, Ms. Wormwood may request, via message 725, a list of members that have joined the session. In response to receiving message 725, receiver 110 transmits to the requestor, Ms. Wormwood, the list of clients that have joined the session in message 730. The list of clients may include the session IDs of the clients.

Alternatively, Ms. Wormwood may request receiver 110 to send moderator client device 120 a notification when a new member client device joins a session. In this case, Ms. Wormwood may transmit message 735 to receiver 110, including a request to notify moderator client device 120 of new member client devices 130 that join the session. The ShareCast server running on receiver 110 maintains a database of the clients connected to the ShareCast server for each session. Additionally, any of the clients may query the database and receive the list of clients connected to the ShareCast server (e.g., participating in the session). In response to message 735, the receiver transmits to moderator client device 120 message 740, which acknowledges that receiver 110 received message 735. Subsequently, when a new member client device requests to join the session via message 745, the student's name or ID is transmitted by receiver 110 to moderator client device 120.

More specifically, message 745 may correspond to a request to join the session sent from Calvin's member client device. In response to receipt of message 745, receiver 110 transmits message 750 to Calvin's member client device 130. Message 750 acknowledges that receiver 110 received message 745 and has added Calvin's member client device 130 to the session. Receiver 110 also transmits message 755 to moderator client device 120, notifying Ms. Wormwood moderator client device 120 that Calvin's member client device 130 has joined the session.

Once a session is established, and one or more members have joined the session, moderator client device 120 may control certain aspects of the session. For example, moderator client device 120 may control which member client devices 130 participate in the session by rejecting a request to join. Moderator client device 120 may transmit a message to receiver 110 indicating that member client device 130 should be disconnected from the session.

Figure 8:
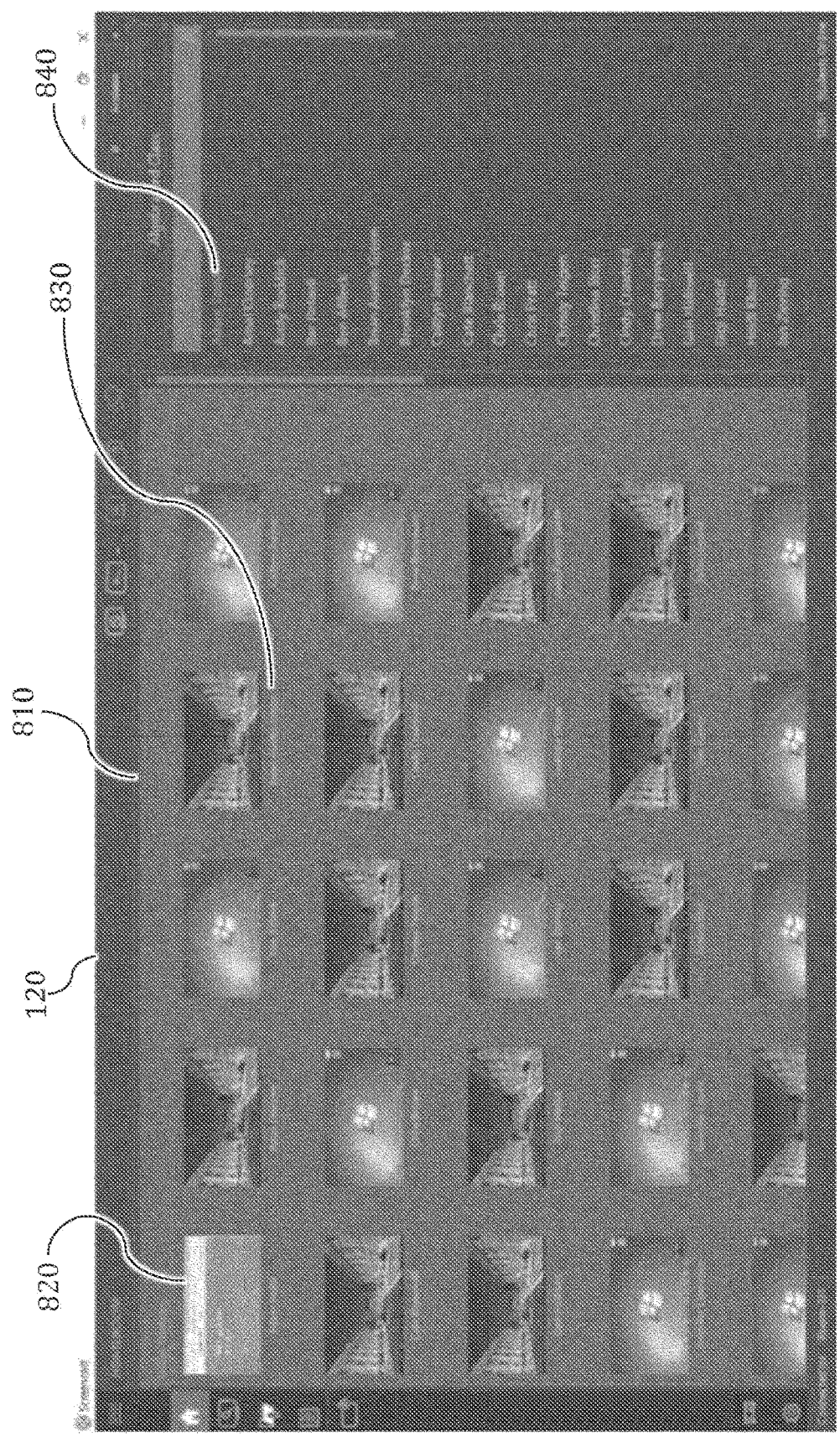
FIGS. 8 and 9 are views of a thumbnail monitoring screen in accordance with the illustrative embodiment of FIG. 5.
Figure 9:
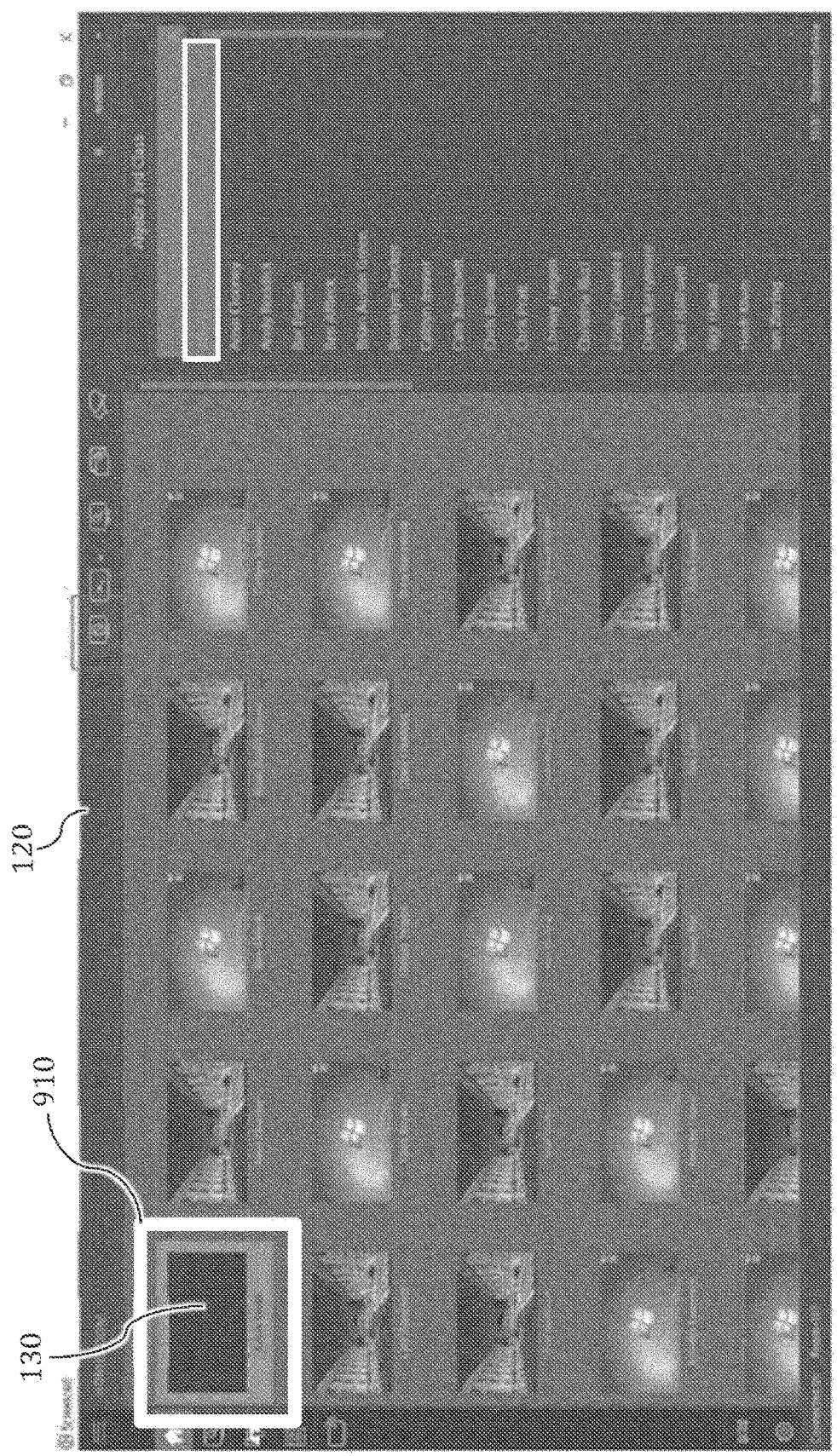
Figure 10:
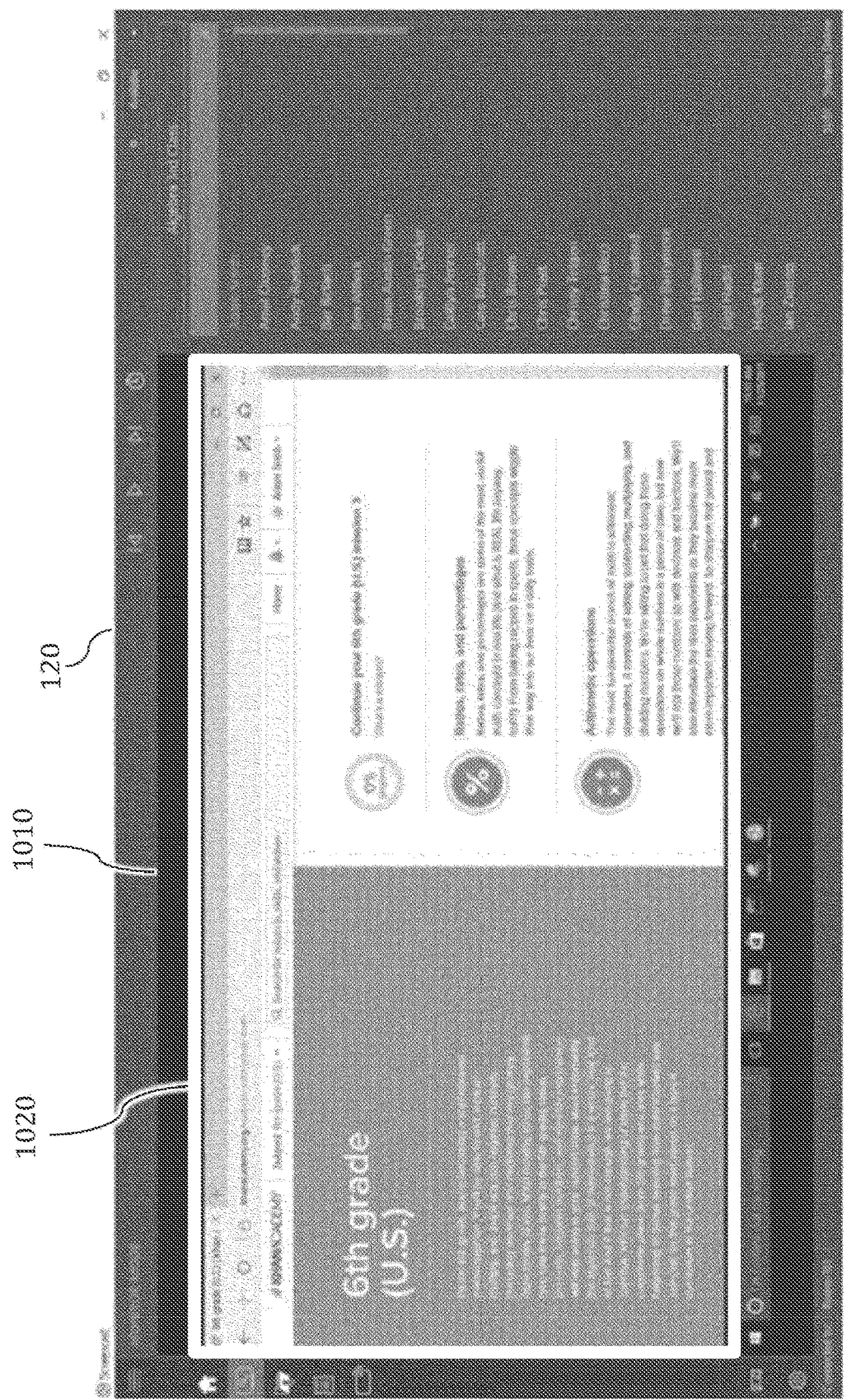
FIG. 10 is a view of a mirrored member client screen in accordance with the principles of the present invention.

FIGS. 8-10 demonstrate how teacher moderator client device 120 may view the screens of member client devices 130 once a session has been initiated. A teacher may wish to check on the progress of one or more of the students, for example, to determine if one or more of the students are making progress in solving a problem or if one or more of the students are off task.

Referring now to FIG. 8, teacher moderator client device 120 may display monitoring interface 810, which shows thumbnail view 820 of the display of each student client member devices 130. Thumbnail view 820 may be generated and periodically updated using techniques known in the art. Monitoring interface 810 displayed on moderator client device 120 preferably includes mirrored screen images corresponding to the display for each student client member device 130. Monitoring interface 810 also may include name 830 associated with the member client device or other identification below thumbnail view 820. Monitoring interface 810 also may include a sidebar that displays list 840 of member client devices corresponding to each thumbnail view 820 displayed on monitoring interface 810.

With respect to FIG. 9, the teacher, using moderator client device 120, may select a particular student whose local display is promoted for display to the class on display 105 by receiver 110. Selection may be made using a handheld pointing device, such as a mouse or trackball, touchscreen, or any of a number of other well-known computer pointing and selection methods. Alternatively, moderator client device 120 may be programmed with speech recognition software, such as the Windows Speech Recognition software, available with Windows 10 ®, which enables the teacher to select the member client device to be displayed simply by saying the student's name or ID number. In yet another example, motion recognition software and hardware, such as Intel® RealSense™ SDK, may be coupled with receiver 110, allowing for selection to be made by making a gesture, such as a pointing gesture. Upon making client member selection 910, an enlarged representation of the screen of selected member client device 130 is displayed on teacher's moderator client device 120.

FIG. 10 illustratively depicts screen 1010 of teacher moderator client device 120 after one of the student member client devices has been selected as indicated at 810 in FIG. 9. Teacher's screen 1010 provides a simultaneous display of student's screen 1020 of selected member client device 130. In addition, the teacher, using moderator client device 120, may take control of member client device 130 and provide input from moderator client device 120 that becomes directly visible on the display of the selected student. As another example, during a collaborative business meeting, a team leader using moderator client device 120 may view and markup the screen of a team member's member client device 130 to facilitate discussion related to something displayed on the team member's member client device.

In an embodiment in which Moderator client device 120 controls one or more of member client devices 130, the user input from moderator client device 120 may simulate the user input of member client device 130. For instance, a teacher may access student's member client device 130 to show the student where to input an answer. The moderator may also initiate data transfer from moderator client device 120 to member client device 130. For example, a paragraph from a text editor may be copied from moderator client device 120 and pasted into a text editor of member client device 130. In addition to such bi-directional communication between moderator client device 120 and selected client member device 130, moderator client device 120 also may direct receiver 110 to mirror the display of selected client member device 130.

Figure 11:
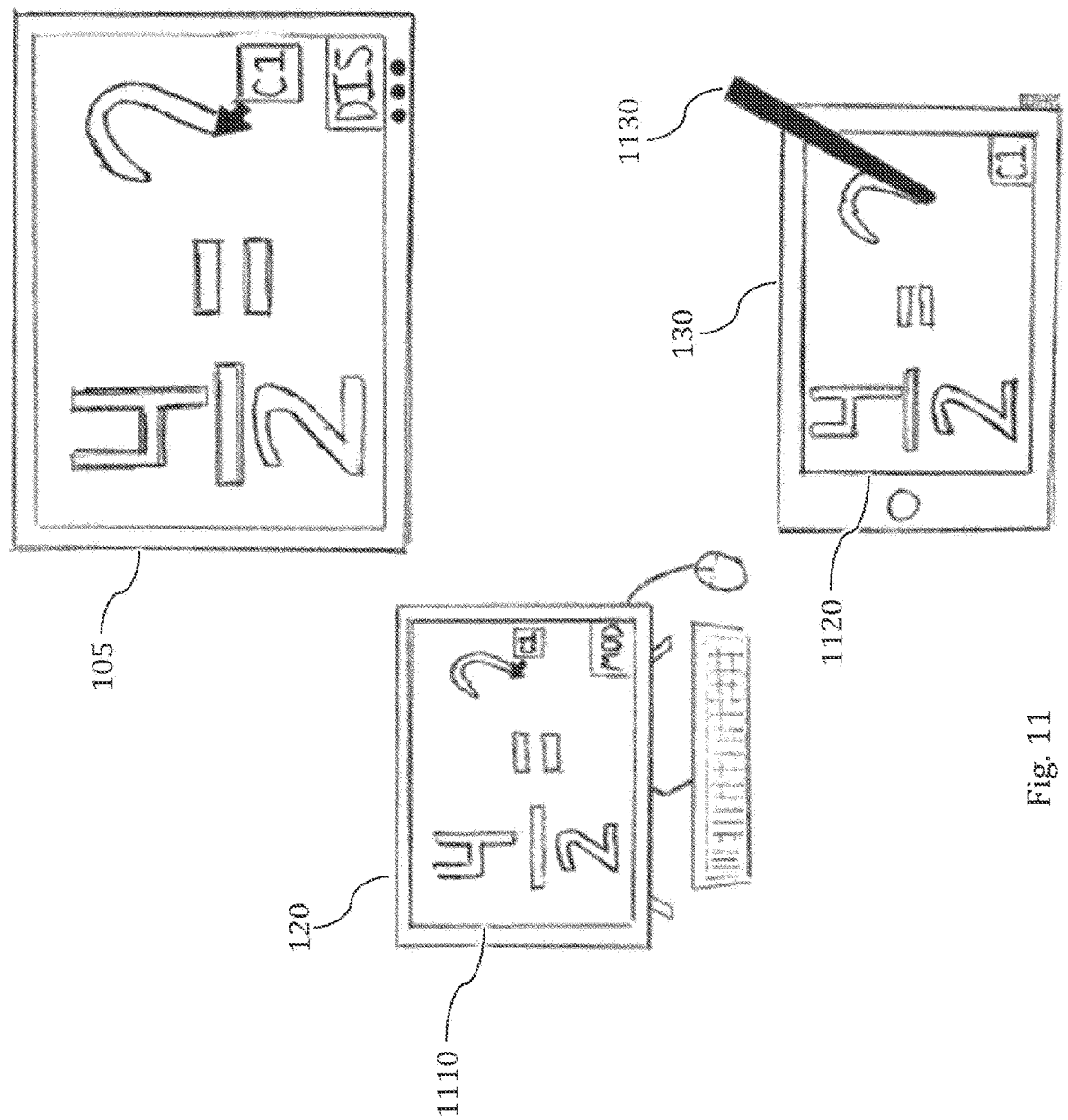
FIG. 11 is a diagram of a moderator client device, a member client device and a display device in accordance with an alternative embodiment.
Figure 12:
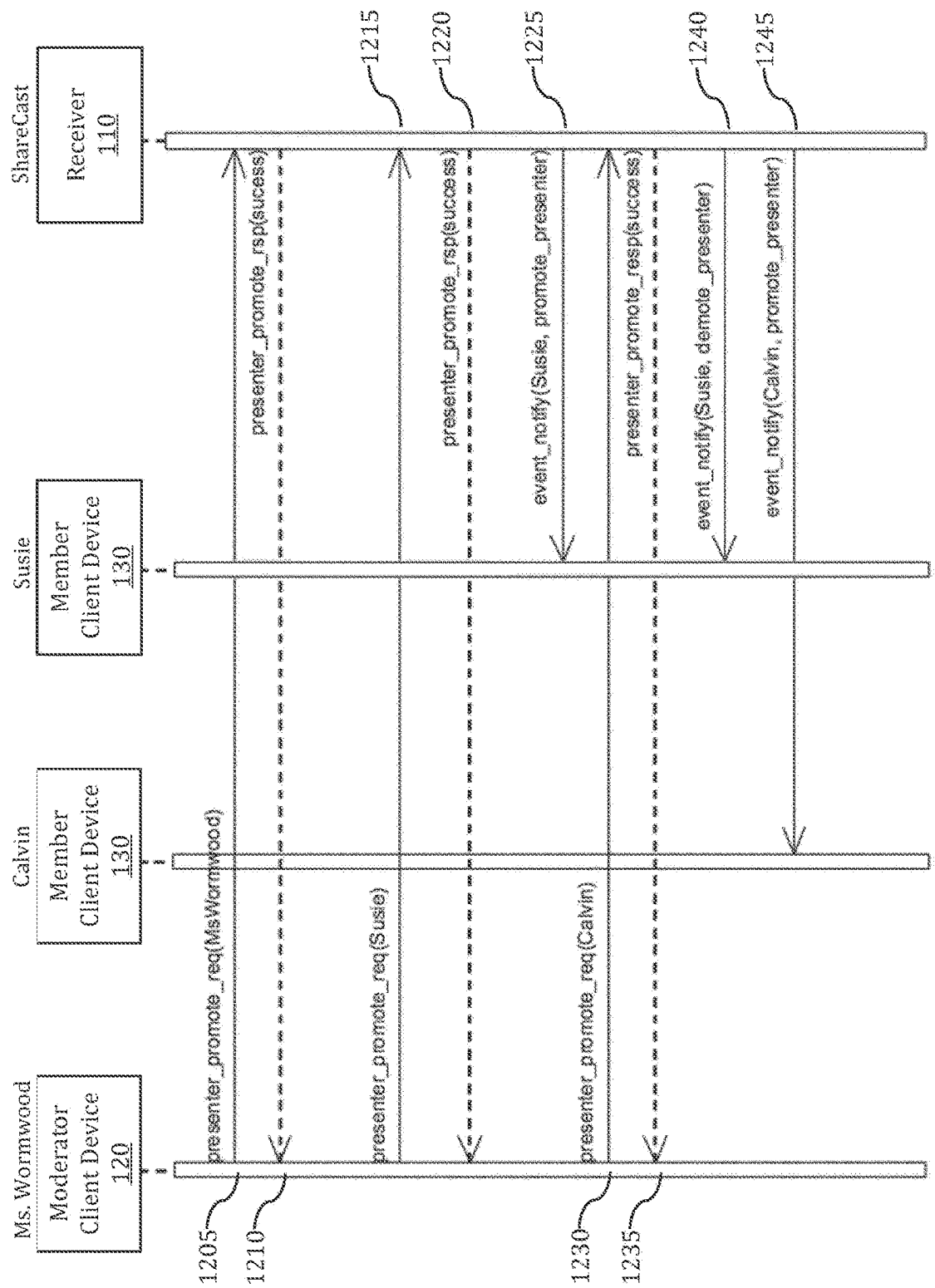
FIG. 12 is a sequence diagram for promoting member clients in accordance with an alternative embodiment.

Referring to FIG. 11, in accordance with another aspect of the present invention, a non-presenting client device may be given control of a presenting client device such that the non-presenting client device may remotely interact with the display of the presenting client device. In this manner, the cursor of the presenting client's device may be remotely controlled by input on the non-presenting client device. For example, a teacher using moderator client device 120 deemed a presenting client device may grant a student access to control moderator client device 120 via the student's member client device 130. Screen 1110 of moderator client device 120 may be displayed on screen 1120 of member client device 130, the screen of display 105, or both. The student may use stylus 1130, or any other input device, to input information or content onto moderator client device 120. The receiver may also be coupled with motion recognition software and hardware, allowing for input by simply gesturing. The input from member client device 130 may appear on screen 1110 of teacher's member client device 120, on display 105, or on both screen 1110 and display 105. The input from the non-presenting client, such as mouse movements and/or keystrokes, may be recorded for later review and deletion. This arrangement may be particularly desirable where the teacher selects one student to answer a problem and displays to the whole class that student's approach to answering the problem. The student's input then may be erased, or the problem modified slightly, after which another student may be requested to solve the problem. Alternatively, member client device 130 may be given control of a different member client device that is deemed a presenting client.

A content sharing session also may facilitate file transfers between moderator client device 120 and member client devices 130. Typically, moderator client device 120 will request that member client devices 130 transmit a file. For example, at the end of a teaching session, the teacher may transmit to all of the students a request to transmit the file containing content each student was working on during the teaching session. In yet another example, moderator client device 120 may transmit a request to only specific students. Alternatively, moderator client device 120 may transfer a file from the moderator client device 120 to the member client devices 130. Further, students using member client devices 130 may request to push files to the teacher's moderator client device. In this case, moderator client device 120 may accept or deny the request. Member client, device 130 also may transfer tiles to one or more other member client devices 130. Moderator client device 120 preferably has supervisory authority to monitor and/or allow such file transfers.

Apart from sharing the display content, moderator client device 120 and member client devices 130 also may communicate via a messaging protocol. Typically, in a classroom setting, it is expected that member client devices 130 may only communicate with moderator client device 120, but may not use the messaging protocol to communicate with one another. Messaging between moderator client device 120 and member client device 130 may be on a private chat channel or may be in a group chat setting. Alternatively, some of all of member client devices 130 may communicate with one another if given permission to do so by moderator client device 120. A message sent between member client devices 130 also may be sent to moderator client device 120 such that the user of moderator client device 120 may monitor the communications between member client devices 130.

The content sharing system described herein allows the moderator client complete discretion over what is displayed on moderator client device 120, member client devices 130 and display 105. Once a content sharing session is initiated, the moderator client may indicate to receiver 110 which content to display.

Before the moderator client selects or "promotes" a client device to be the presenter, display 105 is in a ready-to-present mode, but does not display content received from the moderator or member clients. Similarly, the clients are in a connected-and-not-presenting mode. To display content, the moderator may promote either moderator client device 120 or one or more member client devices 130 to be the presenter using the message sequences illustratively depicted in FIG. 12.

To promote a client, moderator client device 120 first transmits to receiver 110 message 1205, which includes a request to promote moderator client device 120 to be the presenter. When a session is initiated, no client is a presenter, and no content from a member client device is transmitted to display 105 until a member client device is promoted. In response to receipt of message 1205, receiver 110 transmits to moderator client device 120 acknowledgment message 1210, confirming that moderator client device 120 has been promoted to be the presenter. Once a client has been promoted to be a presenter, the promoted client device transmits to receiver 110 content to be displayed on display 105.

In a preferred embodiment, only moderator client device 120 may transmit to receiver 110 requests to promote other clients to be the presenter. For example, moderator client device 120 may transmit to receiver 110 message 1215 that requests that the member client device associated with ID "Susie" be a presenter. In response to receipt of message 1215, receiver 110 then promotes member client device 130 of "Susie" to be the presenter, so that the display of Suzie's member client device is shown on display 105. Receiver 110 transmits acknowledgment message 1220 to moderator client device 120, indicating that member client device 130 has been promoted to be the presenter. Receiver 110 also may transmit to member client device 130 of "Susie" message 1225 that indicates that her member client device has been promoted to presenter. In response to being promoted, member client device 130 of "Susie" transmits content to receiver 110 to be shown on display 105.

Generally, it is expected that it may be useful for only one client to be a presenter at a time. In this case, when a member client device is promoted to be the presenter, the previous presenter is demoted (e.g., no longer the presenter). For example, moderator client device 120 transmits to receiver 110 message 1230 that requests that member client device 130 of "Calvin" be promoted to presenter. In response to receiving message 1230, receiver 110 promotes member client device 130 of "Calvin" to be the presenter and demotes member client device 130 of "Susie" so that she is no longer the presenter. Receiver 110 transmits to moderator client device 120 message 1225 that indicates that member client device 130 of "Calvin" has been promoted and also transmits to member client device 130 of "Susie" message 1240 that indicates that her member client device has been demoted from being the presenter. Receiver 110 also transmits to member client device 130 of "Calvin" message 1245 that indicates that member client device 130 of "Calvin" has been promoted to be the presenter. Thus, in accordance with the principles of the present invention, multiple clients may be authorized to transmit to receiver 110 content to be displayed on display 105 in a seriatim manner. In embodiments with multiple clients, moderator client device 120 transmits to receiver 110 individual messages that request promotion or demotion of individual clients.

Figure 13:
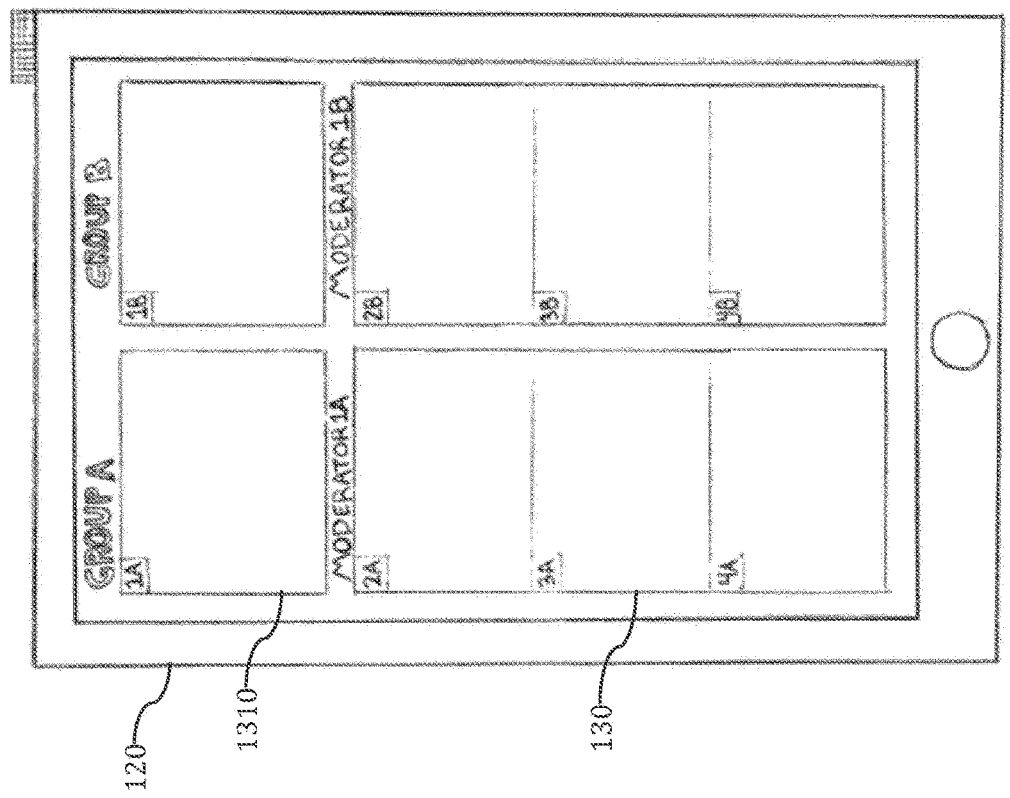
FIG. 13 is a view of a tiered moderator monitoring screen in accordance with a further alternative embodiment of the present invention.

Referring now to FIG. 13, member client devices 130 may be separated into groups. For example, in a classroom setting, the teacher may separate the students into two groups, Group A and Group B. Moderator client device 120 of the teacher may display tiered thumbnail screens of each member client device 130, separated into their respective groups. In this manner, the teacher may assign each group different tasks but simultaneously review the progress of each group. Alternatively, a teacher may assign a single task and monitor the progress of each member of each group.

In accordance with another aspect of the present invention, a moderator client, such as a teacher, may designate a group moderator client device for each group. Moderator client device 120 may then delegate to the group moderator client device some or all of the capabilities of the moderator client device. Group moderator client's screen 1310 may appear larger on the tiered thumbnail display of moderator client device 120 than the non-moderator members or include some other visual indicator of status, such as being displayed at the top of the group. The screen of moderator client device 120 also may display the name or other identification of the group moderator and the names of the non-moderator member clients in that group.

As indicated above, the member client device selected to be group moderator member device also may be delegated some or all of the privileges of moderator client device 120. For example, a teacher may designate a student as the moderator of Group A. During a presentation, Group A leader may choose to display the content of his or her device on display 105, or may choose to display the device of any member client device 130 within Group A. The moderator privilege also may allow the moderator of Group A access to view the content of the group member's screens.

FIG. 14 depicts simultaneous display of multiple client screens in an illustrative classroom setting. In this example, the teacher's desktop computer is associated with moderator client device 120 while the group member tablet computers are associated with member client devices 130. The screen at the front of the classroom is associated with display 105. The teacher may select two groups of students, G-1 indicated by the bracket at 1410 and G-2, indicated by the bracket at 1420. The teacher also may designate member client device 1430 as the moderator of group G-1 and member client device 1440 as the moderator of group G-2.

After initiating a group content sharing session and organizing the class into groups G-1 and G-2, the teacher may send a problem to each student member client device 130. Teacher's moderator client device 120 may simultaneously display original content 1450 sent to the student member client devices along with the current view of any or all member client devices 130, such as the screen of G-1 moderator client device 1430 screen and the screen of G-2 moderator 1440. In this example depicted in FIG. 14, the teacher's screen shows original content 1450 reading "4/2=?", as well the screen of group G-1 moderator client device 1430 showing the correct answer of "4/2=2", and the screen of group G-2 moderator 1440, showing an incorrect answer of "4/2=3". Alternatively, the teacher could choose to view all student member clients' screens in the tiered thumbnail view shown in FIG. 13 to determine if any student in group G-2 had computed the correct answer.

While the teacher may choose which screens to view on moderator client device 120, the teacher also may delegate display privileges of display 105 to the group moderators. The group G-1 moderator may transmit to display 105 the content on the screen of group G-1 moderator client device 1430 or the content on any other screen of group G-1 member client devices. Similarly, the group G-2 moderator device may transmit to display 105 the content on the screen of group G-2 moderator client device 1440 or the content on any other screen of group G-2 member client devices.

Group moderators may view the screens of the members from their own group. For example, group G-1 moderator may view thumbnail representations of the screens of some or all other group G-1 member client devices, in a manner similar to that discussed above with respect to FIG. 13. Although group moderators may view the screens of their group members, they cannot view or display the screens of non-group members or the screen of the original moderator.

Referring still further to FIG. 14, the group-1 moderator chose to transmit to display 105 the content on the screen of group G-1 moderator client device 1430. Similarly, the group G-2 moderator chose to transmit to display 105 the content on the screen of group G-2 moderator client device 1440. In accordance with another aspect of the present invention, receiver 110 is programmed to permit split-screen side-by-side comparison of the screen content of both group G-1's answer 1460 and group G-2's answer 1480. This allows students to compare their work to that of the other groups. The moderator client device 120 may be used to select the arrangement and presentation of the content being streamed from multiple devices. Selection may be made using various well-known selection techniques discussed above, such as a trackpad or touch screen as well as voice commands and gesturing. Simultaneous streaming also may be used for a variety of other purposes, such as competitions and gaming.

Each session may be automatically recorded or optionally may be selected for recording during the creation of a session or at some point during the session. At the end of each session, moderator client device 120 may save a recording of the session for archiving and future playback. The recorded session may include all content displayed on display 105 as well as all content displayed on moderator client device 120 and member client devices 130. The content recorded also may include all input from both moderator client device 120 and member client devices 130 as well as audio recorded using microphones 620 in member client devices 130 or any other audio recording device in member client device 120 or display 105. Any messaging between moderator client device 120 and member client devices 130 or solely between member client devices 130 also may be archived for later playback.

Figure 15:
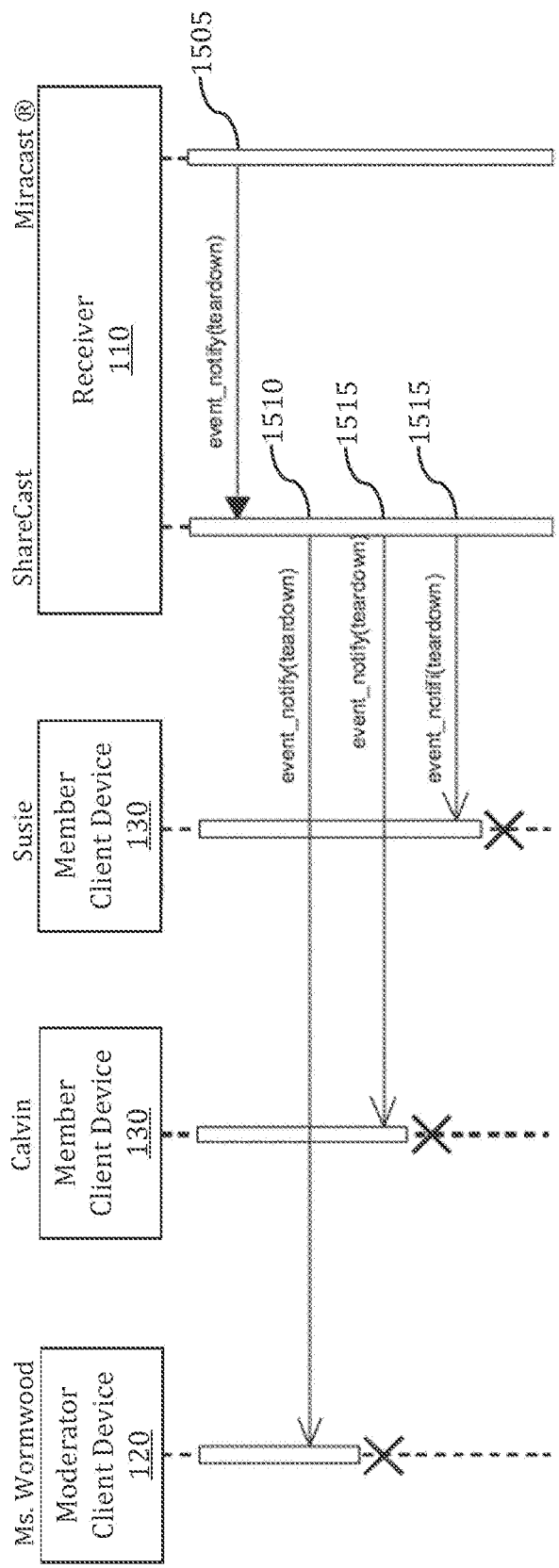
FIGS. 15 and 16 are sequence diagrams for terminating a session in accordance with the principles of the present invention.
Figure 16:
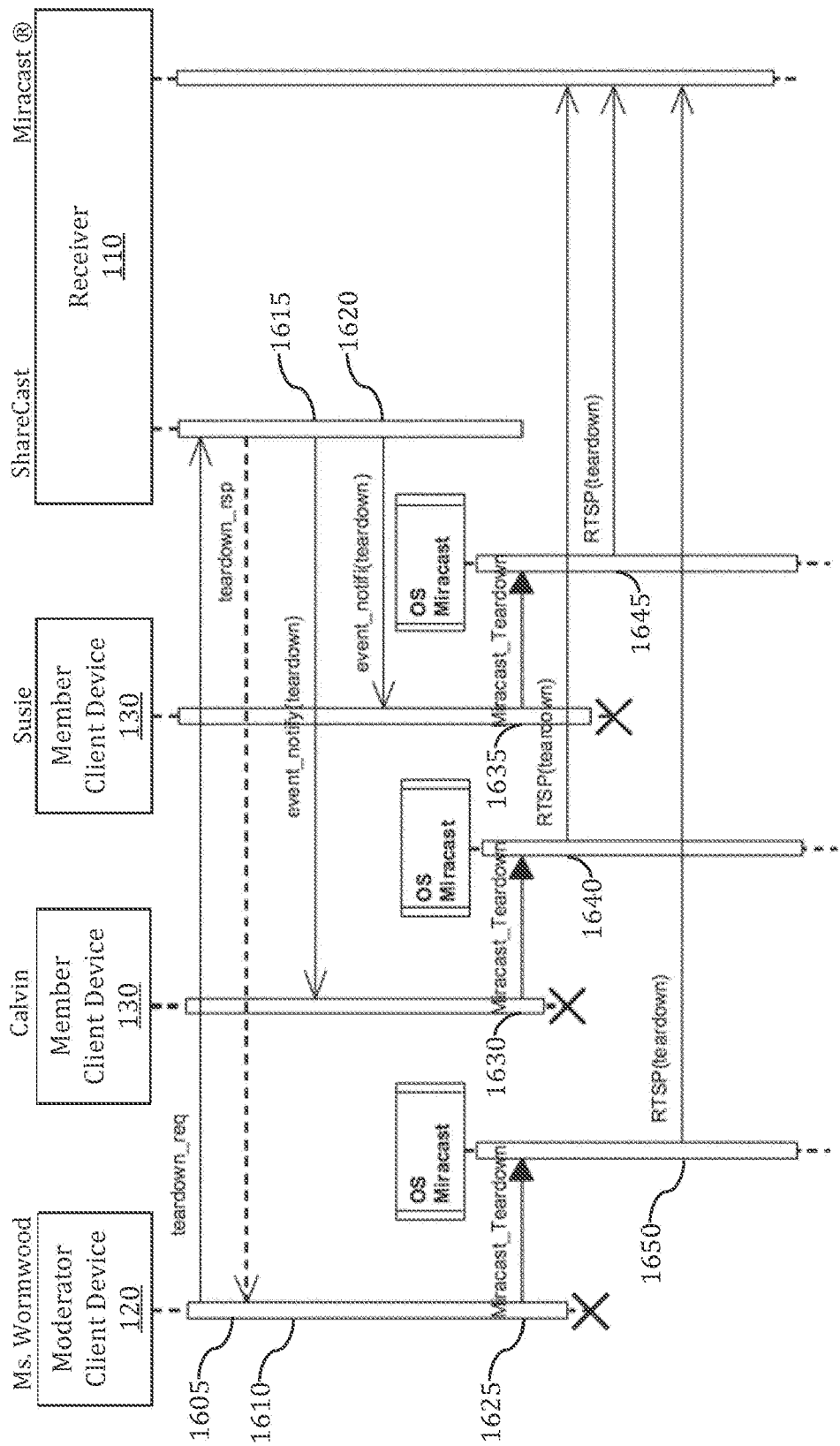

The content sharing session may be terminated when the class has ended, for example, or when a portion of the lesson is over. FIGS. 15 and 16 describe an illustrative sequence of steps for terminating a session.

In FIG. 15, a session is terminated by receiver 110 when the Miracast® server of receiver 110 indicates to the ShareCast server via message 1505 that the session should be terminated. In response to receipt of message 1505, the ShareCast server transmits a message to each of the clients to terminate the session. In the context of classroom environment discussed with respect to FIG. 7, ShareCast server transmits message 1510 to moderator client device 120, message 1515 to member client device 130 of "Calvin," and message 1515 to member client device 130 of "Susie." Message 1510, message 1515, and message 1520 each indicate that the session is to be terminated. In response to receiving a message indicating that the session is to be terminated, each of the clients terminates its connection to receiver 110.

Alternatively, as depicted in FIG. 16, moderator client device 120 may initiate termination of the session by transmitting to the ShareCast server of receiver 110 message 1605, which requests termination of the session. In response to receipt of message 1605, receiver 110 transmits to moderator client device 120 message 1610 that confirms that the session is to be terminated. In response to receipt of message 1610, moderator client device 120 transmits message 1625 to the Miracast protocol application of moderator client device 120, indicating that the session is to be terminated. Receiver 110 then transmits message 1615 to member client device 130 of "Calvin" and message 1620 to member client device 130 of "Susie," which indicates that the session is to be terminated.

Upon receipt of message 1615, member client device 130 of "Calvin" transmits message 1630 to the Miracast® protocol application of member client device 130 of "Calvin," indicating that the session is to be terminated. Likewise, upon receipt of message 1620, member client device 130 of "Susie" transmits message 1635 to the Miracast® protocol application of member client device 130 of "Calvin," indicating that the session is to be terminated. In response to messages 1625, 1630, and 1635, the Miracast® protocol application of each respective client device transmits message 1650, 1640, and 1645 to the Miracast® server of receiver 110, indicating successful teardown of the session.

It should be understood that any of the operations described hereinabove may be implemented at least in part as computer-readable instructions stored on a computer-readable memory. Upon execution of the computer-readable instructions by a processor, the computer-readable instructions may cause a node to perform the operations. It will, of course, be understood that the embodiments described herein are illustrative, and components may be arranged, substituted, combined, and designed in a wide variety of different configurations, all of which are contemplated and fall within the scope of this disclosure.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for interactively sharing content on a plurality of devices comprising:
    a first local network comprising:
        a first display;
        a plurality of first member client devices; and
        a first receiver operatively coupled to the first display;
    a second local network comprising:
        a second display;
        a plurality of second member client devices; and
        a second receiver operatively coupled to the second display;
    a first access point in communication with the plurality of first member client devices and the first receiver;
    a second access point in communication with the plurality of second member client devices and the second receiver;
    the first access point and the second access point being in communication with one another via an Internet connection; and
    the first receiver configured to:
        receive a request to begin a content sharing session from a first one of the plurality of first member client devices;
        compare the first one of the plurality of first member client devices to a list of authorized moderator client devices;
        promote the first one of the plurality of first member client devices to a moderator client device upon confirming that the first one of the plurality of first member client devices is included in the list of authorized moderator client devices;
        receive first content from the moderator client device;
        send the first content to the second receiver for display on the second display; and
        send the first content to the first display for display on the first display.

2. The first receiver of claim 1, further comprising programmed instructions to:
    receive, from the second receiver, second content received from the first one of the plurality of the second devices; and
    send the second content to a third display operatively coupled to the first receiver for display on the third display while the first content is simultaneously displayed on the first display.

3. The first receiver of claim 1, further comprising programmed instructions to:
    compare the first one of the plurality of first devices to a list of authorized moderator devices; and
    determine that the first one of the plurality of first devices is on the list of authorized moderator devices.

4. A first receiver operatively coupled to a first display, the receiver comprising:
    memory configured to store computer-executable instructions, and
    at least one computer processor configured to access memory and execute the computer-executable instructions to:
        establish a connection with a plurality of first devices via a first local network;
        establish a connection with a second receiver in communication with a plurality of second devices via a second local network different than the first local network, the second receiver operatively coupled to a second display;
        receive a request to begin a content sharing session from a first one of the plurality of first devices;
        set up the content sharing session in response to receiving the request to begin the content sharing session;
        set the first one of the plurality of first devices as a moderator device such that the first one of the plurality of first devices may display content on the first display and the second display and may select one of the plurality of first devices or one of the plurality of second devices as a presenting device;
        receive a request to join the content sharing session from a first one of the plurality of second devices;
        set the first one of the plurality of second devices as a non-presenting device;
        receive first content from the first one of the plurality of first devices;
        send the first content to the second receiver to be displayed on the second display;
        send the first content to the first display to be displayed on the first display;
        receive, from the moderator device, a request to set the first one of the plurality of second devices as a secondary moderator device such that the first one of the plurality of second devices may set one of the plurality of second devices as a presenting device for the second display; and
        set the first one of the plurality of second devices as the secondary moderator device.

5. The first receiver of claim 4, wherein the connection established with the second receiver is an Internet connection.

6. The first receiver of claim 4, wherein the first local network is Wi-Fi or Wi-Fi direct.

7. The first receiver of claim 4, further comprising programmed instructions to:
    receive, from the moderator device, a request to set the first one of the plurality of second devices as the presenting device; and
    set, in response to the request to set the first one of the plurality of second devices as the presenting device, the first one of the plurality of the second devices as the presenting device such that the first one of the plurality of second devices may display content on the first display and the second display.

8. The first receiver of claim 7, further comprising programmed instructions to:
receive, from the second receiver, second content received from the first one of the plurality of the second devices.

9. The first receiver of claim 8, further comprising programmed instructions to:
send the second content to the first display for display on the first display.

10. A method comprising:
establishing a connection with a plurality of first devices via a first local network;
establishing a connection with a second receiver in communication with a plurality of second devices via a second local network different than the first local network, the second receiver operatively coupled to a second display;
receiving a request to begin a content sharing session from a first one of the plurality of first devices;
setting up the content sharing session in response to receiving the request to begin the content sharing session;
comparing the first one of the plurality of first devices to a list of authorized moderator devices;
determining that the first one of the plurality of first devices is on the list of authorized moderator devices;
setting the first one of the plurality of first devices as a moderator device such that the first one of the plurality of first devices may display content on a first display and the second display and may select one of the plurality of first devices or one of the plurality of second devices as the presenting device;
receiving a request to join the content sharing session from a first one of the plurality of second devices;
setting the first one of the plurality of second devices as a non-presenting device;
receiving first content from the first one of the plurality of first devices for display on the first display and the second display;
sending the first content to the second receiver to be displayed on the second display; and
sending the first content to the first display to be displayed on the first display.

11. The method of claim 10, wherein the connection established with the second receiver is an Internet connection.

12. The method of claim 10, wherein the first local network is Wi-Fi or Wi-Fi direct.

13. The method of claim 10, further comprising:
receiving, from the moderator device, a request to set the first one of the plurality of second devices as the presenting device; and
setting, in response to the request to set the first one of the plurality of second devices as the presenting device, the first one of the plurality of the second devices as the presenting device such that the first one of the plurality of second devices may display content on the first display and the second display.

14. The method of claim 13, further comprising:
receiving, from the second receiver, second content received from the first one of the plurality of the second devices; and
sending the second content to the first display for display on the first display.

15. The method of claim 10, further comprising:
receiving, from the moderator device, a request to set the first one of the plurality of second devices as a secondary moderator device such that such that the first one of the plurality of second devices may control the second display as well as set one of the plurality of second devices as the presenting device; and
setting the first one of the plurality of second devices as the secondary moderator device.

16. The method of claim 15, further comprising:
receiving, from the second receiver, second content received from the first one of the plurality of the second devices; and
sending the second content to a third display for display on the third display while the first content is simultaneously displayed on the first display.

* * * * *